US006064417A

United States Patent [19]

Harrigan et al.

[11] Patent Number: 6,064,417

[45] Date of Patent: May 16, 2000

[54] LASER PRINTER USING MULTIPLE SETS OF LASERS WITH MULTIPLE WAVELENGTHS

[75] Inventors: Michael E. Harrigan, Webster; Badhri Narayan, Rochester, both of N.Y.

[73] Assignee: Eastman Kodak Company, Rochester, N.Y.

[21] Appl. No.: 09/052,592

[22] Filed: Mar. 31, 1998

[51] Int. Cl.[7] .......... G02B 3/00

[52] U.S. Cl. .......... 347/232; 347/233; 347/241; 359/662; 385/1; 385/115

[58] Field of Search .......... 347/115, 232, 347/233, 238, 239, 241, 242, 243, 244; 359/204, 662; 385/1, 115, 48

[56] References Cited

U.S. PATENT DOCUMENTS

| | | | |
|---|---|---|---|
| 4,253,102 | 2/1981 | Kataoka et al. | 347/234 |
| 4,393,387 | 7/1983 | Kitamura | 347/240 |
| 4,445,126 | 4/1984 | Tsukada | 347/242 |
| 4,637,679 | 1/1987 | Funato | 359/18 |
| 4,728,965 | 3/1988 | Kessler et al. | 347/241 |
| 4,806,951 | 2/1989 | Arimoto et al. | 347/235 |
| 4,900,130 | 2/1990 | Haas | 359/198 |
| 4,911,526 | 3/1990 | Hsu et al. | 385/115 |
| 5,018,805 | 5/1991 | Kessler | 347/232 |
| 5,295,143 | 3/1994 | Rao et al. | 372/22 |
| 5,305,023 | 4/1994 | Fukushige et al. | 347/116 |
| 5,463,418 | 10/1995 | Tateoka | 347/244 |
| 5,471,236 | 11/1995 | Ito | 347/233 |
| 5,751,462 | 5/1998 | Shiraishi et al. | 359/204 |
| 5,802,222 | 9/1998 | Rasch et al. | 385/1 |
| 5,832,155 | 11/1998 | Rasch et al. | 385/48 |
| 5,835,280 | 11/1989 | Griffith | 359/662 |

*Primary Examiner*—N. Le
*Assistant Examiner*—Hai C. Pham
*Attorney, Agent, or Firm*—Svetlana Z. Short

[57] ABSTRACT

A color printer for imaging on an image plane includes: (a) a plurality of light sources, each of the light sources being adapted to provide a spatially coherent, composite beam of light, each of the composite beams including a plurality of spectral components; (b) a single beam shaping optics accepting the composite beams, the beam shaping optics having optical elements adapted to shape said composite beams by a different amount in a scan direction and a cross scan direction, so as to form for each of the composite beams (i) a first beam waist in the cross scan direction of the composite beam and (ii) a second waist in the scan section of the composite beam, the first and second beam waists being spaced from one another; (c) a deflector adapted to move said plurality of composite beams across the image plane, the deflector being located closer to the first beam waists than to the second beam waists; and (d) scan optics located between the deflector and the image plane, the scan optics being adapted to (i) geometrically conjugate said deflector to the photosensitive medium in the cross scan direction of each composite light beam for each of the spectral components, and (ii) re-image the first and second waists onto the image plane.

18 Claims, 15 Drawing Sheets

LASER PRINTER USING MULTIPLE SETS OF LASERS WITH MULTIPLE WAVELENGTHS

FIELD OF THE INVENTION

This invention relates to laser printers utilizing multiple sets of lasers to expose a photosensitive medium, and in particular, to color laser printers where each set of lasers has at least two lasers of different wavelengths.

BACKGROUND OF THE INVENTION

Laser printers utilizing multiple lasers as light sources are known. Such laser printers are used primarily for one of two reasons as described below.

First, multiple lasers of the same wavelength are used to increase the printing speed of a laser printer by simultaneously scanning across and exposing a photosensitive medium with several laser beams. More specifically, these laser beams form several adjacent laser spots that are scanned simultaneously across a photosensitive medium during a sweep of a single polygon facet. Thus, several lines of the photosensitive medium are exposed simultaneously, enabling a faster laser printer.

Light intensity distribution of each laser spot at the photosensitive medium is approximately gaussian. The diameters of the exposed pixels are equal to the diameters of the laser spots at their 50% intensity level. One major problem with simultaneous, multiple spot printing is achieving sufficient overlap of the adjacent exposed pixels on the photosensitive medium to provide uniform exposed areas without image artifacts. Unless these pixels, and thus, the exposed scan lines have sufficient overlap of their light intensity profiles, the presence of individual scan lines on prints will be apparent and objectionable. Therefore, a printer that utilizes multiple lasers to simultaneously expose a photosensitive medium must have means for appropriate overlap of the exposed pixels and for producing appropriate spot sizes. The following patents describe different approaches for producing proper laser spot overlaps, and thus proper pixel exposure and proper scan line overlap at the photosensitive medium.

U.S. Pat. No. 4,253,102 discloses a printer that produces a desired scan line pitch (i.e., spacing between the scan lines) by utilizing an inclined semiconductor laser array having a plurality of laser light emitters. More specifically, these laser light emitters are arranged in a line that is tilted with respect to the line scan direction. In such arrays, all laser light emitters operate at the same wavelength. The pitch of the laser light emitters on this array is $P_o$ (as shown in FIG. 2 of this patent). Scanning across the photosensitive medium with the laser beams produced by the array that is tilted by an angle θ (See FIG. 3 of this patent ) results in the pitch of the laser spots at the photosensitive medium that is $P'=P_o\cos(\theta)$.

U.S. Pat. No. 4,393,387 also discloses a printer with a semiconductor laser array having a plurality of laser light emitters. This printer produces the desired pitch of the laser spots at the photosensitive medium, and thus the desired line pitch, by utilizing a prism that changes the apparent pitch of the laser light emitters. The pitch of the laser spots at the photosensitive medium in the cross scan direction can also be adjusted to a desired value by using reflectors as shown in U.S. Pat. No. 4,445,126.

Another method of adjusting the pitch of the laser spots is disclosed in U.S. Pat. No. 5,463,418 in which the centroids of the laser spot's intensity distributions are shifted closer to each other by using an aperture stop. This aperture stop is placed in the path of the laser beams and is located in front of a polygon. The frame of the aperture stop blocks off a portion of a laser beam's cross section, thereby creating non uniform laser spots and causing loss of light. U.S. Pat. No. 4,637,679 uses polarizing beam combiners to combine multiple laser light beams so they overlap in the primary scanning direction, but are separated by the required amount in the cross scan direction. Polarizing beam combiners absorb some of the light and thus cause loss of light.

It is also possible to write with more widely spaced scan lines as long as the scan lines in between are exposed in later scans. This method is called interleaving and is described in U.S. Pat. Nos. 4,806,951 and 4,900,130.

The above described laser printers are not color printers. They are not capable of producing color prints because all lasers operate at the same wavelength. In addition, in the above described laser printers, off-axis laser beams enter the post-polygon optics causing these laser printers to suffer from bowed scan lines. The problem of bowed scan lines is described later on in the specification.

A second reason for utilizing multiple lasers in printers is to print color images. This is done by exposing the photosensitive medium, which is sensitive to two or more wavelengths of light, by modulated laser beams of different wavelengths. This type of a laser printer is known and such printers are described in U.S. Pat. Nos. 4,728,965; 5,018,805; 5,471,236; 5,305,023; and 5,295,143. These laser printers are slow because they expose each pixel on the photosensitive medium with a laser beam of different wavelength and scan one line at a time.

SUMMARY OF THE INVENTION

The object of this invention is to simultaneously expose multiple lines of a photosensitive medium with laser beams, each of which laser beams being capable of creating laser spots of two or more wavelengths on a given pixel of a photosensitive medium, thus exposing these pixels with light containing different color wavelengths.

According to the present invention a color printer for imaging on an image plane comprises:

(a) a plurality of light sources, each of the light sources being adapted to provide a spatially coherent, composite beam of light, each of the composite beams including a plurality of spectral components;

(b) a single beam shaping optics accepting the composite beams, the beam shaping optics having optical elements adapted to shape said composite beams by a different amount in a scan direction and a cross scan direction, so as to form for each of the composite beams (i) a first beam waist in the cross scan direction of the composite beam and (ii) a second waist in the scan direction of the composite beam, the first and second beam waists being spaced from one another;

(c) a deflector adapted to move said plurality of composite beams across the image plane, the deflector being located closer to the first beam waists than to the second beam waists; and (d) scan optics located between the deflector and the image plane, the scan optics being adapted to (i) geometrically conjugate said deflector to the photosensitive medium in the cross scan direction of each composite light beam for each of the spectral components, and (ii) re-image the first and second waists onto the image plane.

BRIEF DESCRIPTION OF THE DRAWINGS

FIG. 1*b* illustrates pre-polygon printer components. FIG. 1*c* illustrates post polygon printer components.

FIGS. 15*a*–15*c* show the path of the deflected laser beam for the polygon rotations of 0°,–13.5°, and +13.5°, respectively.

DETAILED DESCRIPTION OF THE PREFERRED EMBODIMENT

In the following discussion and throughout this specification the term "page direction" means the cross scan direction. It is the direction perpendicular to the scan line produced by a rotation of a polygon or other deflector. The term "line direction" means the direction along the scan line produced by the rotation of the polygon or other deflectors. These directions must be understood in the context of the local coordinate system of an optical component; the coordinate system will be tilted by fold mirrors. The optical axis of the printer is the Z axis, the page direction is the X direction, and the line direction is the Y direction.

Figure 1A:
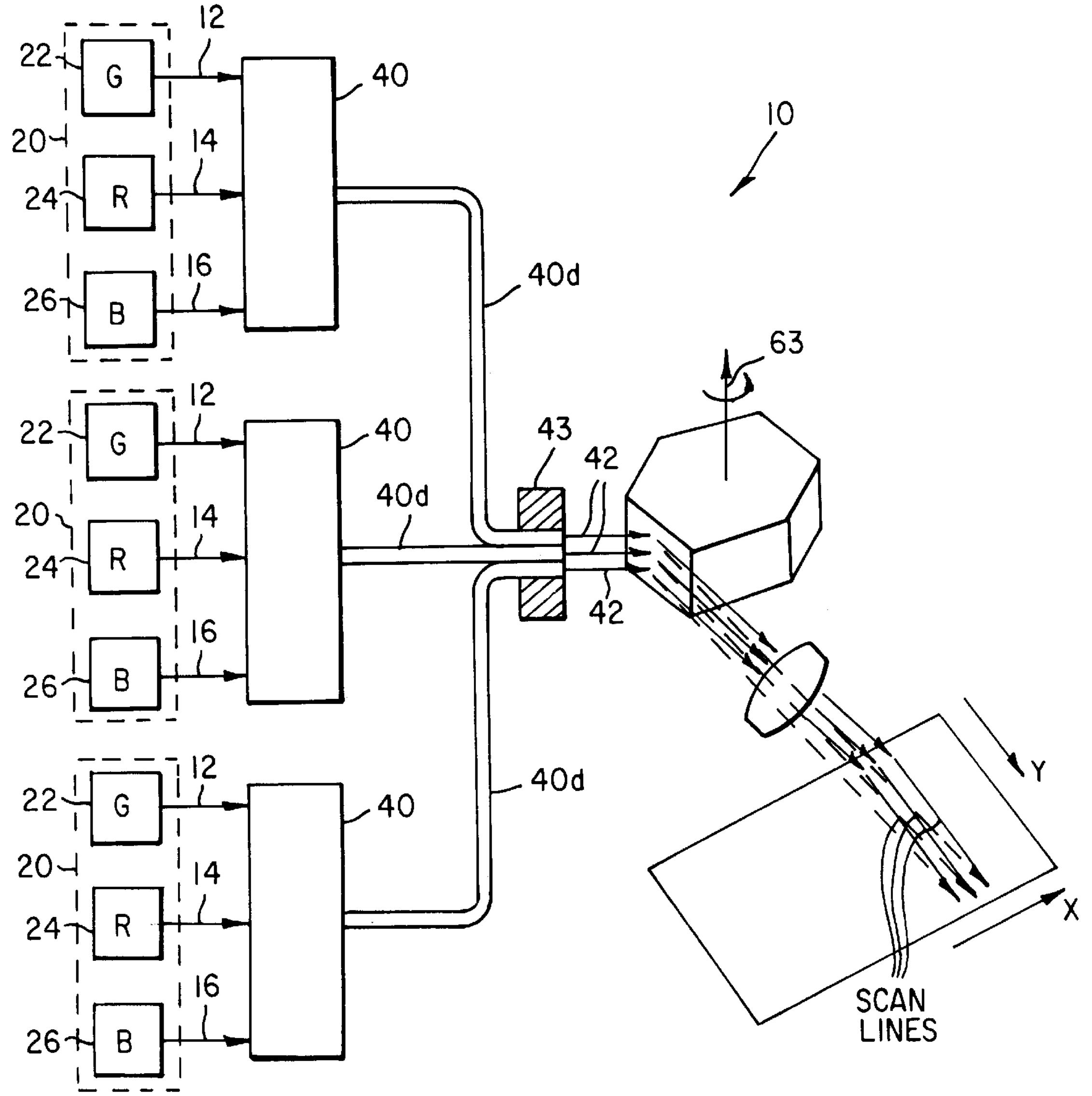
FIG. 1*a* is a schematic illustration of an embodiment of a color printer including three sets of lasers and a rotating polygon.

A printer 10 illustrated in FIG. 1*a* utilizes a plurality of laser beams 12, 14, 16 produced by multiple sets 20 of lasers 22, 24, 26. Each set 20 of lasers 22, 24, 26 provides a plurality of laser beams of at least three different wavelengths (red R, green G and blue B, for example). The plurality of laser beams 12, 14, 16 from each set 20 of lasers 22, 24, 26 are combined (as described below) into a composite beam, therefore producing multiple composite beams, one for each set of lasers. These multiple composite beams are scanned simultaneously across a photosensitive medium that is sensitive to these three different wavelengths, exposing multiple lines of the photosensitive medium with image data. Thus, the photosensitive medium is moved in a page direction at a faster rate than if only one line of the photosensitive medium was exposed at a time, producing color prints faster. It is preferred that the scanning of multiple composite beams be done by a single deflector and that a single f-θ lens be used to focus all of these composite beams on the photosensitive medium. If is preferred that these composite beams be held in a close proximity to one another because the image quality deteriorates when the composite beams are located further away from an optical axis of the f-θ lens. Two embodiments of a holder that provides the required proximity are described in detail in this specification.

Figure 1B:
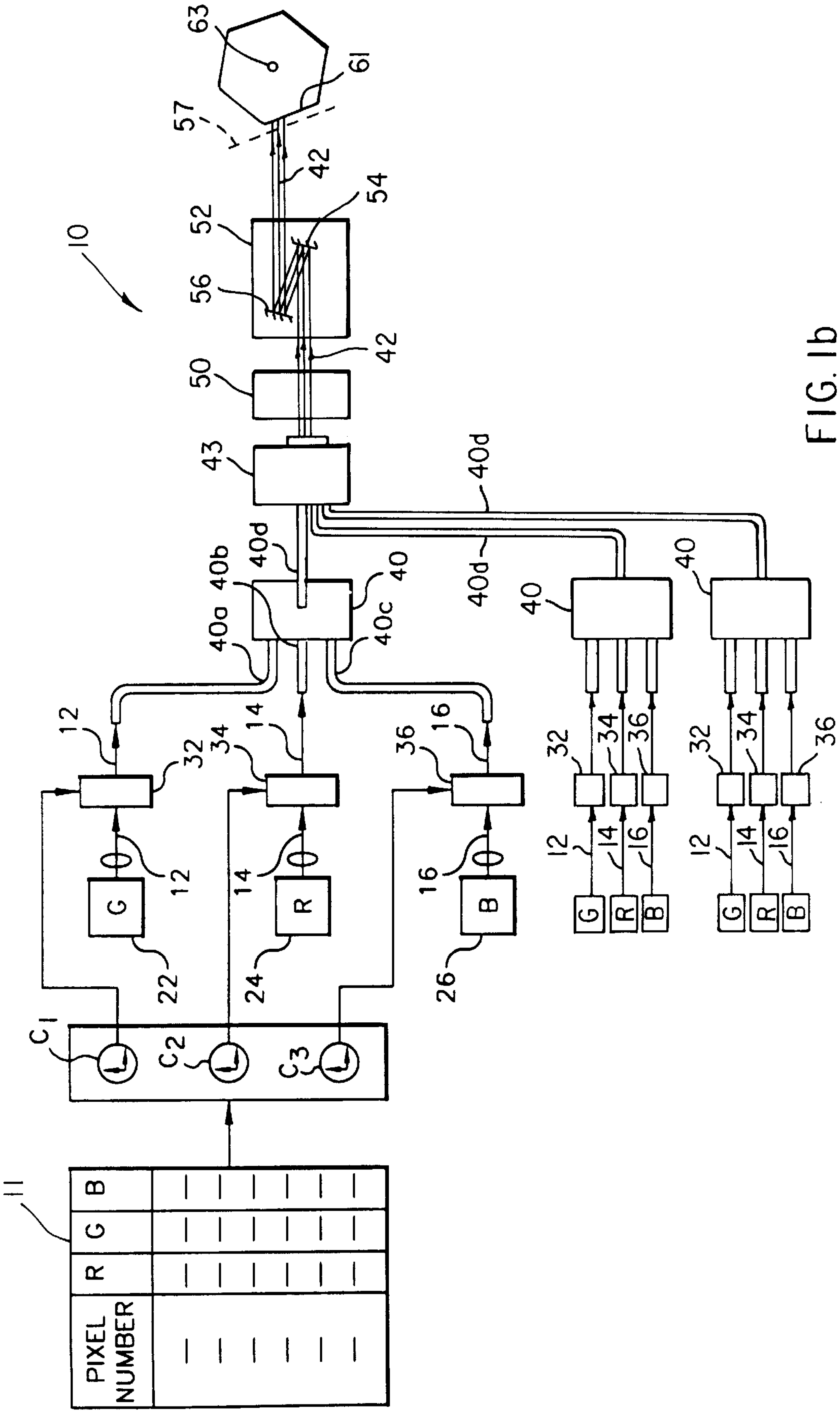
FIGS. 1*b* and 1*c* are more detailed schematic illustrations of an embodiment of the printer of FIG. 1*a*.
Figure 1C:
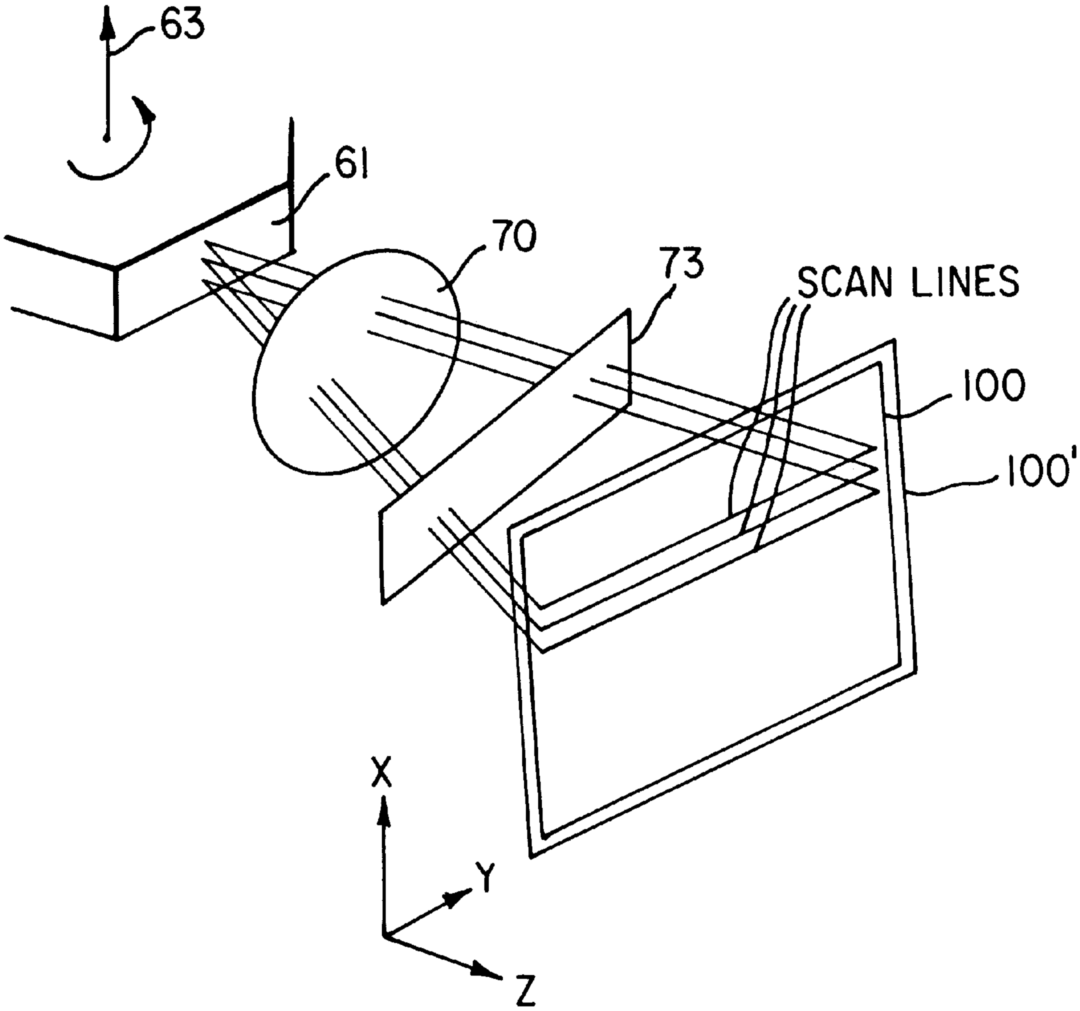

More specifically, the printer 10 of FIGS. 1*a*, 1*b* and 1*c* includes a digital image store 11. This digital image store contains three values for each pixel of each of the scan lines that are being scanned, each of the three values representing the intensity required at one of three wavelengths to produce a correct color on an associated photosensitive medium. As stated earlier in the specification, the printer utilizes a plurality of red, green and blue wavelength laser beams 12, 14, 16 produced by multiple sets 20 of lasers 22, 24, 26. These laser beams 12, 14 and 16 are propagated to a plurality of light intensity modulators. In this embodiment the acousto-optical modulators 32, 34, and 36 are used for modulating the intensity of laser beams 12, 14 and 16 according to image information. Acousto-optical modulators are well known devices. Other means for modulating the laser beams may also be employed.

Each of these acousto-optical modulators 32, 34, 36 modulates its associated laser beam by changing its intensity according to the image data provided. This will be discussed in more detail in the "Lateral Color Correction" section of this specification. All three laser beams are modulated simultaneously.

Figure 2:
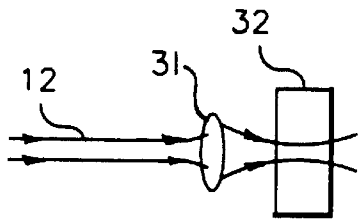
FIG. 2 is a schematic illustration of how one of the laser beams is directed to one of the modulators of the printer of FIG. 1*a*.
Figure 3:
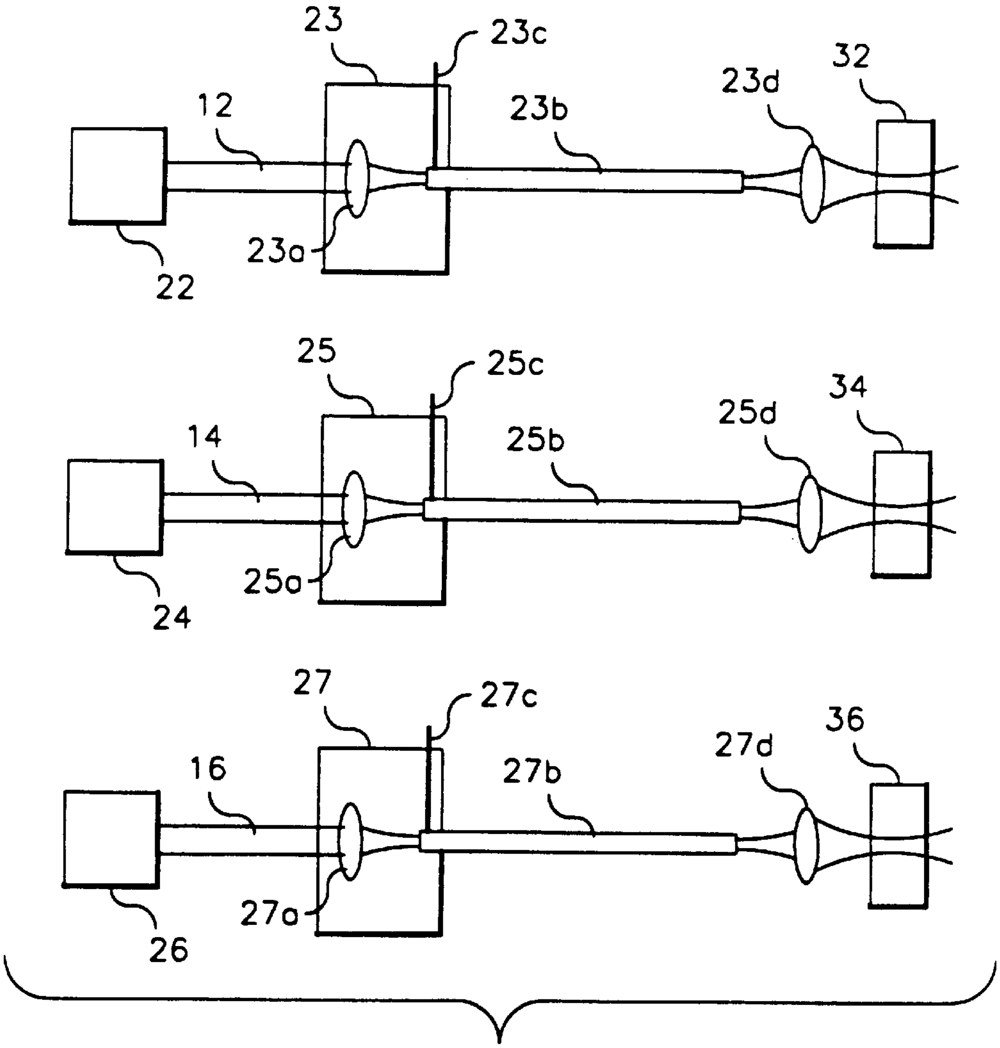
FIG. 3 is a schematic illustration showing how laser beams may be coupled to fibers and then directed to the modulators of the printer of FIG. 1*a*.

Two examples of how to couple laser beams 12, 14, 16 from the laser sources to the modulators are illustrated in FIGS. 2 and 3. FIG. 2 shows that a laser beam 12 is directed to the modulator 32 through a monochromatic focusing lens 31 to form a beam waist at the modulator. A similar arrangement is used for the laser beams 14 and 16. FIG. 3 shows that, alternatively, the laser beams 12, 14, 16 may be coupled to a single mode fiber through a fiber optic connector 23, 25, 27. The fiber optic connector comprises of a first focusing lens 23*a*, 25*a*, 27*a*, a fiber 23*b*, 25*b*, 27*b*, and a fiber holder 23*c*, 25*c*, 27*c* with a mechanical motion capability to precisely locate and maintain the position of the fiber with respect to the laser beam 12, so as to maximize the amount of light coupled into the fiber. The beam waist formed on the end of the fiber 23*b*, 25*b*, 27*b* is re-imaged by a second lens 23*d*, 25*d*, 27*d* to form an appropriate beam waist at the modulator 32, 34, 36. More specifically, the fiber 23*b*, 25*b*, 27*b* circularizes the laser beam and a circular beam waist is then formed at the modulator 32, 34, 36.

Figure 4:
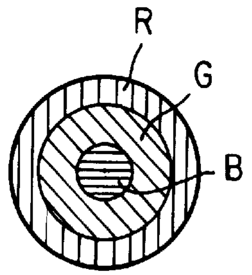
FIG. 4 is a schematic illustration of a composite beam waist formed at an output end of a beam combining fiber.

Modulated laser beams (red, green, blue) from each set 20 of lasers are optically combined into a plurality composite beams 42 (each composite beam having red, green and blue components) by optical combiners such as conventional fiber optic multiplexers 40, as shown in FIGS. 1*a* and 1*b*. The fiber optic multiplexers 40 have appropriate fiber connectors (similar to fiber optic connectors 23, 25, 27) to couple the laser beams exiting the modulators to the input fibers 40*a*, 40*b*, 40*c* of the fiber optic multiplexer 40. (FIG. 1*b*) Thus, the output end of each of the fiber optic multiplexers 40 produces a beam waist of different size in each of the three colors at the output end of each of the beam combining fibers 40*d* (see FIG. 4). The output end of each fiber 40*d* becomes a source of one of the composite beams 42 and corresponds to one scan line on the photosensitive media. Because printer 10 comprises several composite laser beam sources that are placed in close proximity to one another, several adjacent lines of image data are exposed simultaneously, making this color printer faster than the prior art color printers described above.

More specifically, the beam combining fibers 40*d* are single mode optical fibers. The beam waists formed at the output end of each of the beam combining fibers 40*d* are coplanar. In one embodiment the radii of these waists at the exp(−2) power level in this embodiment are: 0.00189 mm at $\lambda$=532 nm (green color G), 0.00172 mm at $\lambda$=457.9 nm (blue color B) and 0.00237 mm at $\lambda$685 nm (red color R). The shapes of the beam waists formed at the output end of each of the beam combining fibers 40*d* are circular.

An advantage of using multiplexers and the holder is that once the beam combining fibers are rigidly held, one has the ability to rotate the output ends of the beam combining fibers together as a unit. Another advantage is the ability to replace, when needed, only one of the lasers instead of replacing a light source containing a multiplicity of laser beams. This makes the optical alignment much simpler because only the optics dedicated to a specific laser will need to be re-aligned.

The composite beams (of red, blue and green components) exit the multiplexers 40 (at the output ends of the beam combining fibers 40*d*. It is preferred that the composite beams be located very close to one another. This proximity is provided by a holder 43. Two embodiments of the holder 43 are described later on in the specification.

The cores of the beam combining fibers contain almost all of the laser power. Thus, it is the cores at the output ends of these fibers that must be located in close proximity to one another. The positioning of the cores at the output ends of the beam combining fibers 40*d* in close proximity to one another is a problem because the cores of the fibers have a very small diameter $d_1$ compared with the outside fiber cladding diameter $d_2$, thus limiting how close the cores can be located with respect to one another. The core diameters $d_1$ are typically less than 4 microns while the cladding diameters $d_2$ are typically about 125 microns. Thus, even if the fibers touch each other, the core centers are separated from one another by about 65 microns. It is preferable to reduce this distance.

Figure 5A:
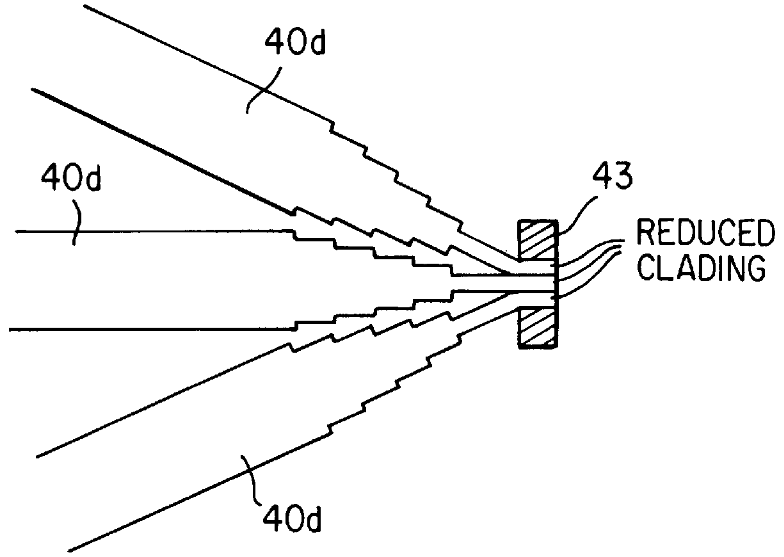
FIG. 5*a* is a schematic illustration of three beam combining fibers with reduced cladding diameter.

A solution for this large separation of the cores is to chemically etch away, or otherwise reduce, the outside cladding of each beam combining fiber in such a way that a tapered profile is fashioned near the output ends of the beam combining fibers. Such fibers 40*d* are shown in FIG. 5*a*. However, if one etches the cladding too close to the core, intensity profiles of the exiting composite beams will be adversely affected. This effect can be minimized if the outside fiber cladding diameter $d_2$ is not reduced to less than three core diameters $d_1$. Thus, if the tapered ends have outside diameters are about 20 microns, and the etching is uniform about the core, and the fiber ends are abutting one another, the centers of the fiber cores are separated by a distance of only 20 microns.

Figure 5B:
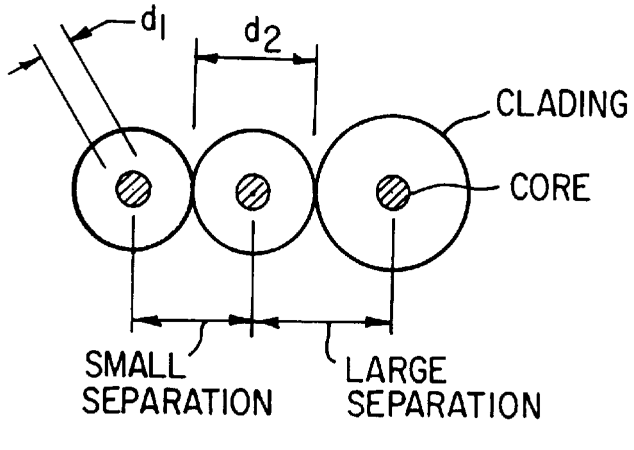
FIG. 5*b* shows unequal separation between fiber cover when the fiber cladding diameters differ from one another.

It is noted that the distance between the fiber cores should be constant or nearly constant (less than 10% variation) in order to achieve uniform exposure at the photosensitive medium. If some of the fibers are etched more than other fibers, and the claddings of the fibers abut one another, the fiber cores will not be separated by a constant distance. This is shown in FIG. 5*b*. The irregular spacing of the fiber cores creates excessive or insufficient pixel overlap on the photosensitive medium, making it difficult to achieve uniform exposure at the photosensitive medium. Thus, care should be taken to ensure that the reduction in fiber cladding is uniform among the fibers.

Figure 6:
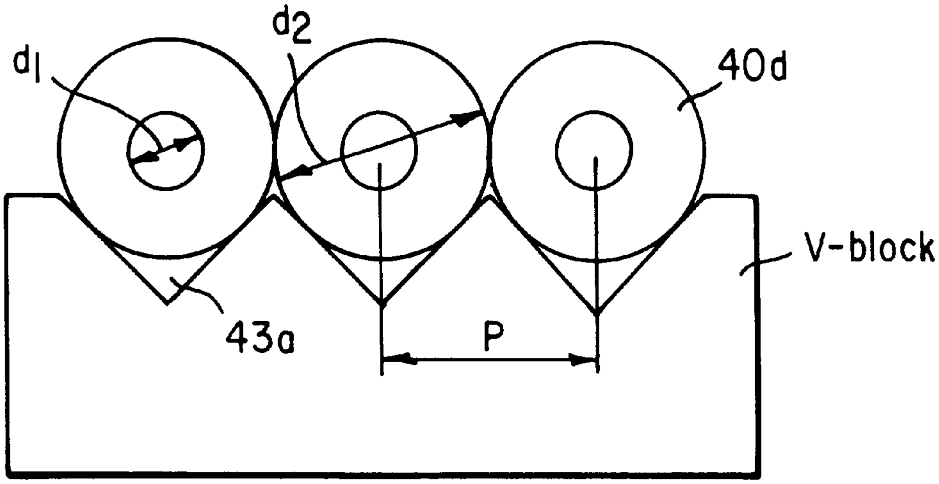
FIG. 6 illustrates a V-block holder with three fibers.

According to the first embodiment of the present invention the holder 43 is a V-block shown in FIG. 6. More specifically, V-block has a plurality of V-shaped grooves 43*a* and the output ends of the beam combining fibers 40*d* are held in a close proximity by these grooves 43*a*. The V-block may be made of a silicon or quartz, for example. FIG. 6 shows an end view of output ends of the beam combining fibers which have had their cladding reduced, so that their outer diameters $d_2$ are three times size of the core diameters $d_1$. The V-block ensures that the cores of the beam combining fibers are centered on their outer diameters. It is noted that it is important to keep the cores centered on the cladding diameters in order to achieve the uniform spacing of the exposed pixels on the photosensitive medium.

Figure 7:
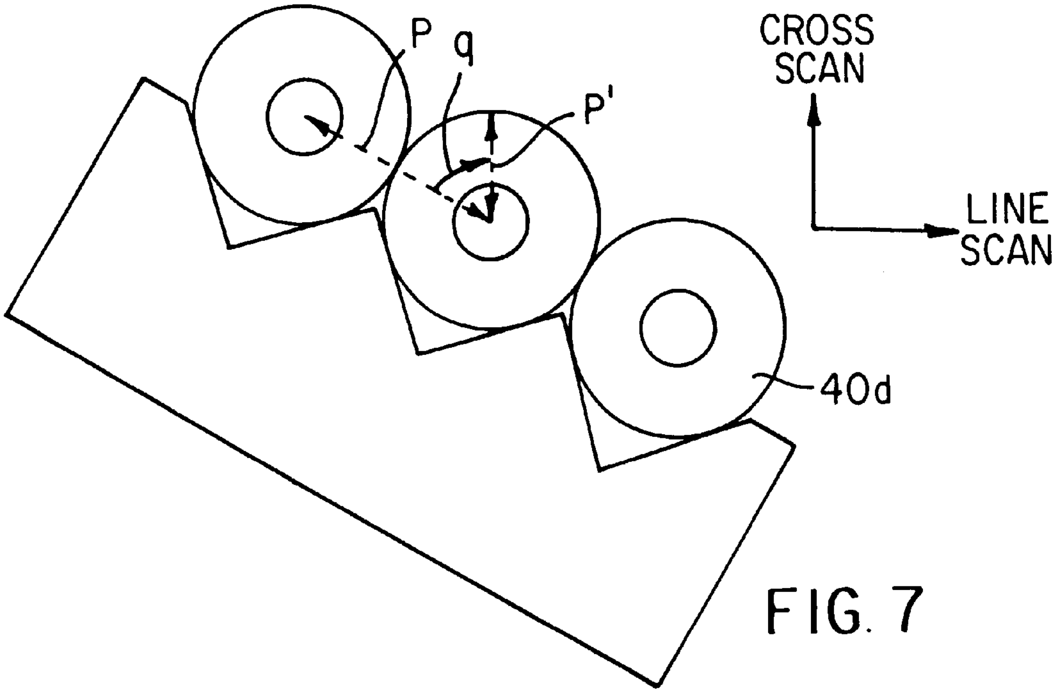
FIG. 7 illustrates tilted V-block holder of FIG. 6.

The cores at the output ends of the beam combining fibers are used as the light sources of the composite beams 42. Thus, even a small separation (such as 10 micrometer separation) between the centers of these fiber cores may result in an undesirably large separation between the exposed pixels, introducing undesirable artifacts into an image. Therefore, some device or a method of operation is required to provide for properly overlapped exposed pixels on the photosensitive medium. One way to do this is to (i) place the output ends of the beam combining fibers into the V- block as described above and (ii) rotate the V-block as shown in FIG. 7 to achieve the desired pitch between the light sources—i.e., the desired spacing between the cores at the output ends of the beam combining fibers. Because of the tilt of the V-holder, the light sources appear to be spaced closer together, such that the intensity distributions of the laser spots produced at the photosensitive medium overlap sufficiently in the cross scan direction. More specifically, the pitch P of the fiber cores, produces an apparent pitch P', when the array of fiber cores is tilted by an angle q. The following equation relates these parameters:

$$P'=P\cos(q)$$

Tilting the array of fiber cores by a large angle makes it possible to avoid reducing the thickness of the cladding at the ends of the beam combining fibers 42. For example, if the cladding is 125 microns in diameter, a core diameter is 5 microns, and the desired pitch is 5 microns, a tilt angle of 87.71 degrees would provide the needed pitch of laser spots on the photosensitive medium. However, such large tilt angles result in sensitivity to pitch changes caused by errors in the tilt angle, because even a relatively small change in the tilt angle q will result in a relatively large change in the pitch of the exposed pixels.

Proper spot overlap in the line scan direction can be achieved through electronic timing of the pixel exposure.

Figure 8:
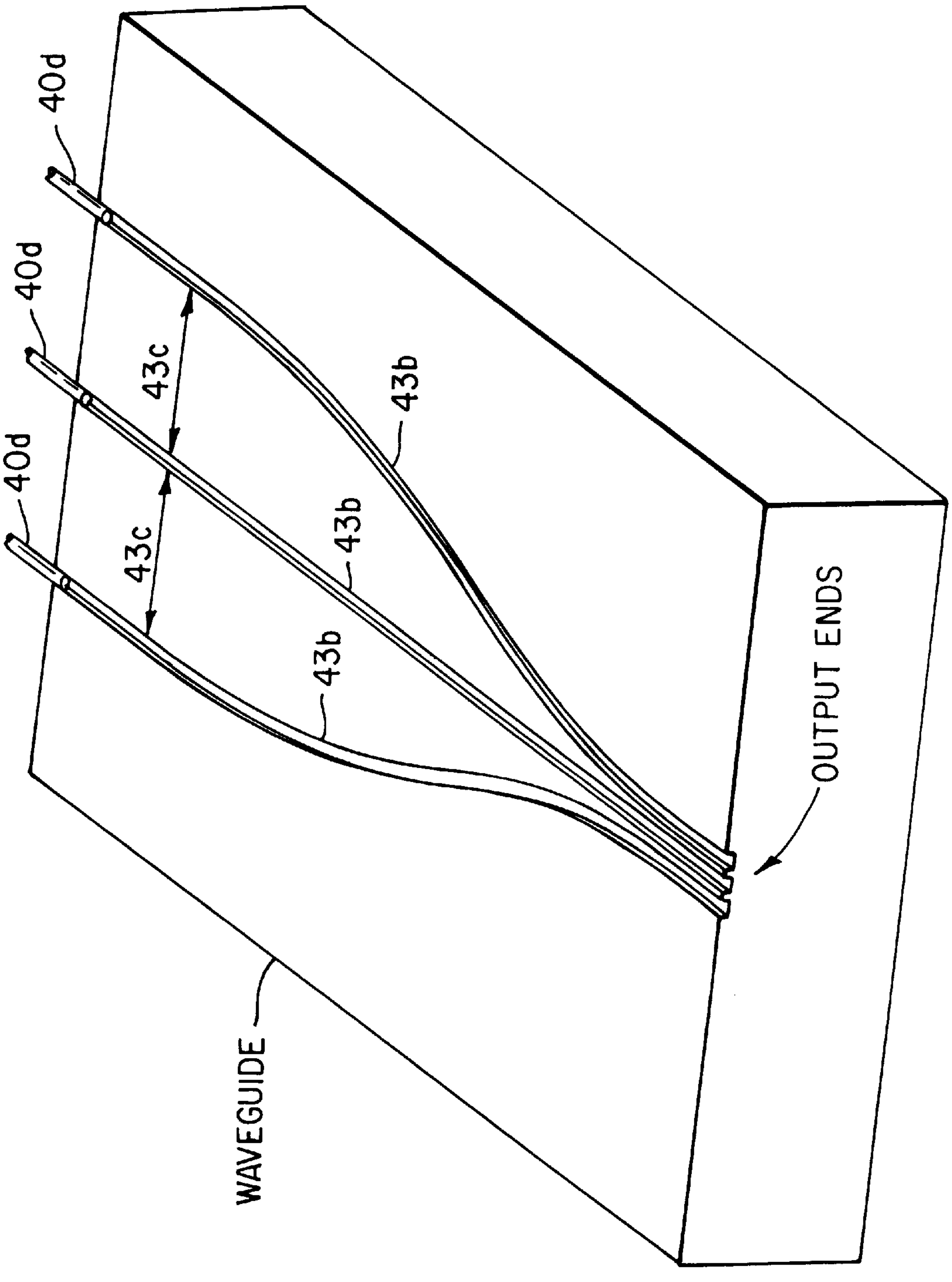
FIG. 8 illustrates a waveguide with a plurality of channels.

In a second embodiment the holder 43 is a waveguide with a set of input ports, a set of output ports and a set of channels 43*b* connecting the input ports to the output ports. According to this embodiment the output fibers 40*d* are coupled into the input ports of the waveguide channels 43*b*. The channels 43*b* are made so that the spacings 43*c* between the channels 43*b* are reduced as the composite beams propagate down their length as shown in FIG. 8. The cross sectional size (i.e., width and height) of each of the waveguide channels 43*b* is maintained along its length so that the composite beams exiting from the output ports of the waveguide channels have substantially the same sizes as the entering composite beams. In this embodiment the output ports of the channels serve as the light sources of the closely spaced composite beams.

The problems associated with uneven etching of fiber cladding can be avoided if the ends of the beam combining fibers are coupled into the input ports waveguide channels as shown in FIG. 8. This coupling requires no etching of claddings. Custom made waveguides such as the one shown in FIG. 8 are commercially available from Photonic Integration Research, Inc., Columbus, Ohio. In order to minimize power loss at the coupling interface, it is important to use a single mode waveguide whose fundamental mode closely matches the mode field size of the beam combining fiber. Also, if a direct coupling method is being used, the ends of the beam combining fibers must be positioned laterally with the waveguide channels so as to satisfy tight tolerance requirements (for example, $\Delta X$ and $\Delta Y$ tolerances should be within less than 10% of final core diameter). The optical axis of each beam combining fiber needs to be aligned with the waveguide channel's axis in order to achieve maximum coupled optical power. Methods for proper coupling of optical fibers to waveguide channels are well known.

In order to avoid cross-talk, the channels of the waveguide must be separated even at the output end of the waveguide. Thus, it may be difficult to have the exiting beams close enough together even if one utilizes the improved waveguide shown in FIG. 8. Therefore, it may be necessary to use another, additional method to provide the adjacent exposed scan lines with sufficient overlap at the photosensitive medium. This may be accomplished, for example, by tilting the waveguide in a way similar to tilting the V-block, so that the line of laser spots exposing the medium has the desired pitch. Similar results may also be accomplished by using interleave printing. The waveguide has the same advantage as the fibers mounted in a V-block. That is, the waveguide can be tilted independently of the laser sources and the rest of the optical system. An advantage of the waveguide over fibers mounted in the V-block is that the waveguide channel dimensions and pitch are controlled easier than the position of the fiber cores within their reduced size cladding.

Another way to have overlapping spots (at approximately 50% of their intensity profiles) is to use interleave printing in which the photosensitive medium is exposed with separated scan lines and the unexposed area between these lines is exposed in later passes of the separated light beams. The scan lines must be spaced by some multiple of the desired pitch. Also, interleave printing can be combined with printing that utilizes a tilted line of scanning laser spots.

Typically, scanning is performed with a single light beam that is scanned in a plane that contains the optical axis of the post-polygon scan optics (such as an f-θ lens, for example). For purposes of this specification this plane is a YZ plane. The present printer utilizes a plurality of composite beams. These composite beams are displaced with respect to one another and should produce a plurality of essentially parallel scan lines at the photosensitive medium (FIG. 1*c*). Because only one of these composite beams can be scanned in a plane containing the optical axis, most of the composite beams are not contained within this YZ plane and enter the scan optics off-axis. We found that there are a series of problems associated with off-axis light beams being scanned by the scan optics, the severity of the problems increasing with the amount of displacement of the off-axis light beams. These problems are described below.

Figure 9A:
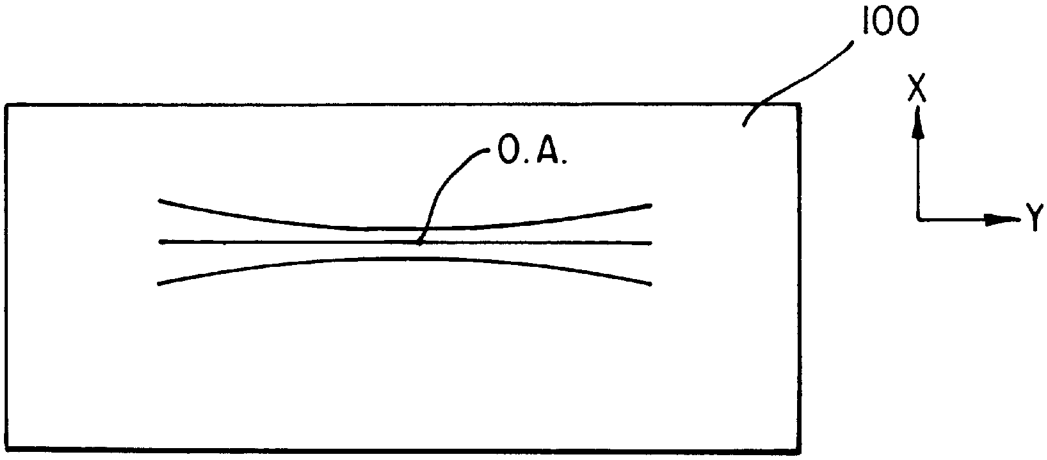
FIG. 9*a* illustrates bowed scan lines.
Figure 9B:
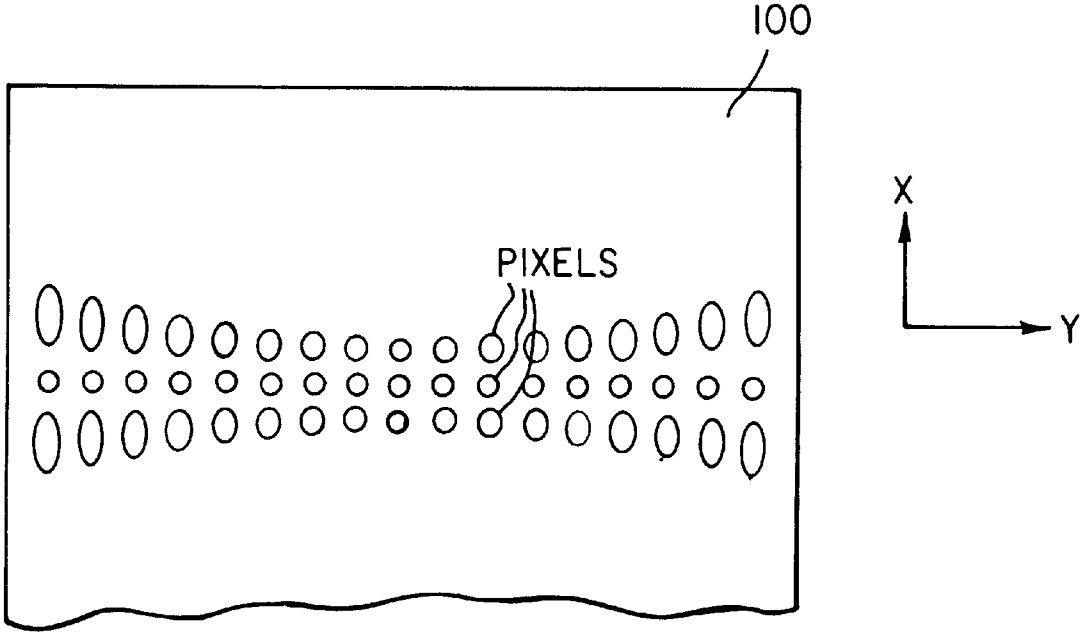
FIG. 9*b* illustrates growth of pixels on the photosensitive medium.

First, an off-axis light beams follow a curved scan trajectory giving rise to the bowed scan lines on the photosensitive medium. (See FIG. 9*a*). Second, off-axis beams have different and generally increased amount of astigmatism (in comparison to the on-axis beam) which can cause a variation in the pixel dimensions and pixel shape as the off-axis beams are scanned across the photosensitive medium (see FIG. 9*b*). Third, off-axis light beams have a more imperfect conjugate relationship between the polygon facet and photosensitive medium in the cross scan direction due to field curvature of the scan optics. These problems and their solutions are described below in more detail.

As stated above, the first problem with scanning multiple composite beams simultaneously is that these composite beams will not be in the plane containing the optical axis of the scan optics, and this can produce bowed scan lines. The amount of bow increases with larger spacing between the composite beams. Therefore, it is highly desirable to have the composite beam be as closely spaced as possible, so that they are near the optical axis of the scan optics. The amount of bow can be further minimized by using the scan optics, which has distortion, such that the scan position (i.e., laser spot location at the photosensitive medium) is proportional to the sine of the angle of the composite beam entering the scan optics (such as f-θ lens, for example). In addition, the use of cross scan optics which makes the polygon facet optically conjugate (as described in the Pyramid Error Correction section of the specification) to the photosensitive medium also greatly reduces the amount of bow. This conjugation provides that each of the composite beams that are imaged on or near the polygon facet 61 pass through one point (for all the three colors) at the photosensitive medium. These points form three lines when the polygon rotates. The fact that the composite beams are off-axis with respect to the scan optics makes this conjugate imperfect, but the error is small enough to ignore when the composite beams are only off-axis by several (≅3 to 6) beam radii. There are other errors associated with such off-axis beams, but they are not a problem unless the displacement of the beams relative to the optical axis is large. In this application we are concerned with displacements of the order of several beam diameters at most, so these errors will not be discussed. Another reason for maintaining good conjugacy between the polygon facet and the photosensitive medium is to compensate for pyramidal errors in the polygon's facets. Thus, a proper optical conjugate relationship will compensate for polygon pyramidal errors and for the bowed lines produced by the scan optics processing the off-axis composite beams.

As stated above, the off-axis composite beams also suffer from astigmatism. This leads primarily to a growth of the laser spots at the photosensitive medium during the rotation of the polygon. That is, pixel sizes grow as the polygon rotates. A certain amount of pixel growth can be tolerated. Thus, the pixel size increase is held in check as long as the composite beams are not too far off axis, and the polygon scan angle is not too large. The amount of tolerable pixel size increase depends on the image quality requirements for a specific printer. For example, in printer 10 the pixel growth is limited to 25%.

The third problem, i.e., the problem of having imperfect imaging in the cross scan direction between the polygon facet and the photosensitive medium during the rotation of the polygon is potentially the most serious. The motion of the polygon facet causes a focus variation of the facet on the image in the cross scan section of the compound beams. This phenomena is called cross scan field curvature. Fortunately, some of this polygon induced cross scan field curvature can be compensated by the field curvature of the scan optics (for example, field curvature of the f-θ lens), but inevitably there is an imperfect cancellation across the scan line. This can lead to banding in those sections of the image where the net field curvature is excessive. Care must be taken to design a proper scan optics to ensure that its field curvature does not add to the field curvature produced by the polygon.

After going through the beam combining fibers 40*d* and the holder 43 the closely located composite beams 42 are directed first towards an apochromatic focusing lens 50, and then to a single set of beam shaping optics 52 (FIG. 1*b*). The focusing lens 50 re-images the three circular beam waists (red R, green G, blue B) produced at the output end 40*d* of each of the beam combining fibers to a second set of larger size beam waists, and thereby decreases the divergence of the three composite beams. The focusing lens 50 is apochromatic to insure that a plurality of three larger size (i.e., imaged) circular beam waists are located in a common plane. The plurality of three larger size circular beam waists produced by the focusing lens 50 comprise a plurality of composite beam waists that constitutes the input to the beam shaping optics 52.

The beam shaping optics 52 includes two cylindrical mirrors 54 and 56. The first cylindrical mirror 54 has power only in the page direction. The second cylindrical mirror 56 has power only in the line direction. In one embodiment, the first cylindrical mirror 54 has concave radius of −119.146 mm in the x-z plane and is tilted in the x-z plane to deviate the composite beams by six degrees. The cylindrical mirror 56 has concave radius of −261.747 millimeters in the y-z plane and is tilted in the y-z plane to restore the composite beam's direction to the direction that it had prior to impinging on the cylindrical mirror 54. The cylindrical mirror 54 shapes each of the composite beams 42 so as to form a plurality of composite beam waists in the page direction. Each of the composite beam waists includes three (essentially coplanar) waists $W_1$, one for each of the three wavelengths. These waists are located in the plane 57 at or near the polygon facet 61. (See FIGS. 1*b* and 10 ). The cylindrical mirror 56 also shapes the composite beam 42 so as to form a plurality of composite waists (each having three coplanar waists, one for each of the three wavelengths) in the line direction. These sets of three (R, G, B) waists $W_2$ are located in the plane 73 (FIG. 11) approximately one meter away, behind the first vertex VI of the f-θ lens 70 (see FIG. 12). This f-θ lens is described in detail in the "F-θ Lens" section of the specification. The sizes and locations of these waists, for each of the three wavelengths, are provided in the "Beam Shaping and Pyramid Correction" section of the specification. The printer of the present embodiment is convenient for use with any beam shaping optics producing waists at the locations given in the "Beam Shaping and Pyramid Correction" section of the specification.

As stated above, after being shaped by the shaping optics 52, the composite beams 42 are directed towards the polygon facet 61. This facet 61 is located at or near plane 57. Although a rotating polygon deflector may be used in the invention, other deflectors or scanning means may also be employed, so long as they are capable of deflecting the composite beams by a sufficient amount at the high speed required by the printer.

At the center of a scan line (here defined as 0° polygon rotation), the composite beam's angle of incidence on the polygon facet 61 is 30 degrees. The composite beams 42 striking the polygon facet 61 and the composite beam 42 reflected from the polygon facet 61 form a plane which is normal to the direction of the polygon's axis of rotation 63. In other words, the angle of incidence has no component in the page direction.

Upon reflection from the polygon facet 61, the deflected composite beams 42 enter the f-θ scan lens 70 as they are being scanned in a plane which is perpendicular to the axis of rotation 63 of the polygon. As described above, each of the composite beams 42 (also referred to as input beams when discussed in conjunction with the f-θ lens) comprises three coherent coaxial laser beams having perspective wavelengths of 458 nm, 532 nm, and 685 nm, and has beam characteristics determined by the fiber optic multiplexer 40, focusing lens 50, and the beam shaping mirrors 54 and 56. The f-θ lens 70, illustrated in FIG. 12, includes means for correcting the primary and secondary axial color aberration. The f-θ lens 70 itself is uncorrected for lateral color. Thus, red, blue and green spots are separated as shown schematically in FIG. 13. The overall printer 10 is corrected for lateral color by modulating the red, green and blue color laser beams at three different data rates as later described. The f-θ lens 70 is corrected so that residual lateral color errors (after a linear electronic correction is applied) are insignificant. The detail description as the f-θ lens 70 is provided in the "F-θ Lens" section of this specification.

Figure 14A:
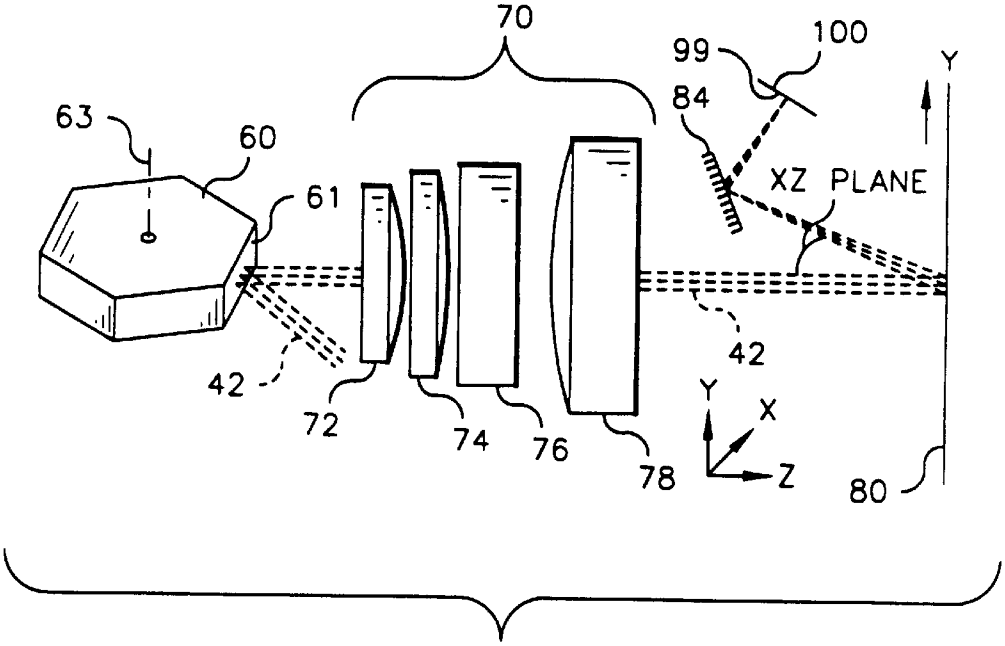
FIG. 14*a* is a schematic elevational view showing the f-θ lens of FIG. 12 in combination with a plano mirror and a cylindrical mirror, and a deflected laser beam going through the F-θ lens and striking the photosensitive medium.
Figure 14B:
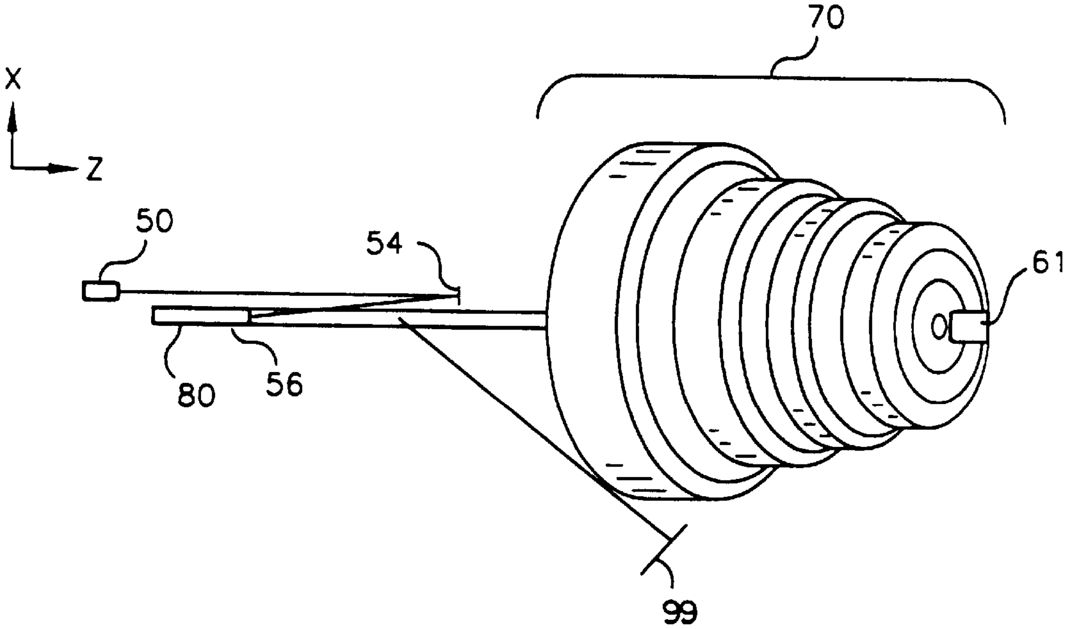
FIGS. 14*b*–14*d* are three perspective views of the f-θ lens of FIG. 12, pre-polygon beam shaping and focusing optics, post-polygon cylindrical mirror, and an associated image surface.
Figure 14C:
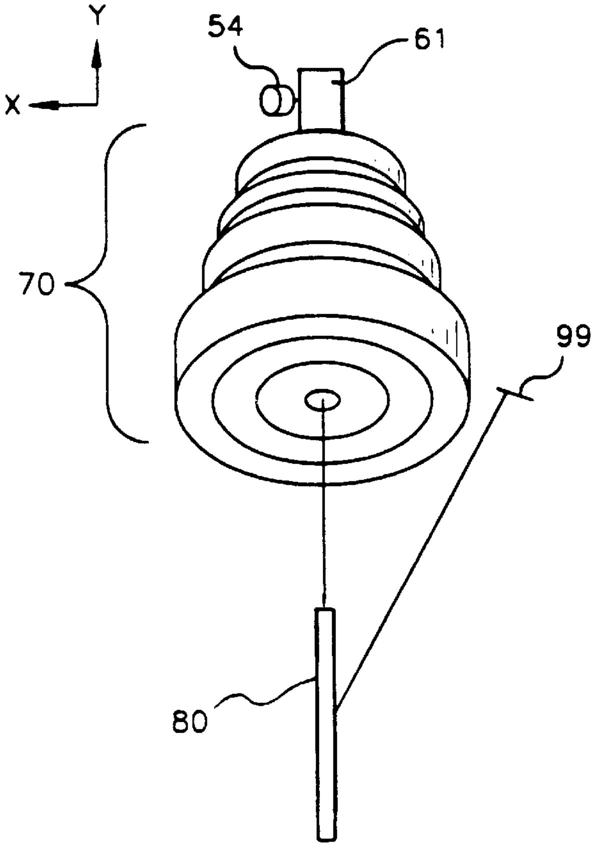
Figure 14E:
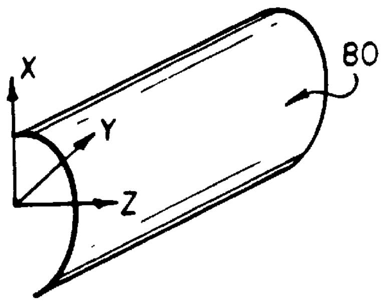
FIG. 14*e* shows an embodiment of the post-polygon cylindrical mirror.
Figure 14D:
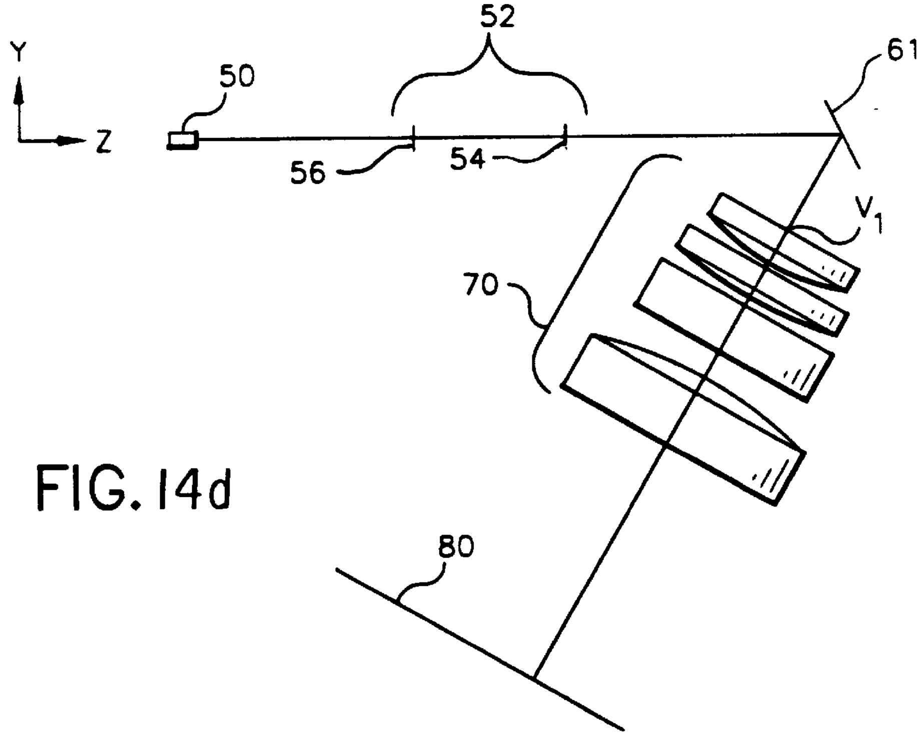

After passing through the f-θ lens 70, the deflected composite beams 42 reflect off a conjugating cylindrical mirror 80 before they impinge on the photosensitive medium 100. (See FIGS. 14*a,* 14*c,* 14*d*). The cylindrical mirror 80 has optical power in X-Z plane (page direction) only (FIG. 14*e*). The cylindrical mirror 80 corrects for pyramid error of the polygon's facets. This is discussed in more detail in the "Beam Shaping and Pyramid Correction" section of the specification.

A plano fold mirror 84 can be placed between the f-θ lens 70 and the cylindrical mirror 80 or between the cylindrical mirror 80 and an image surface 99 in order to place the image surface 99 in a desirable location, where it (at least in line scan direction) coincides with the photosensitive medium 100. Such a fold mirror 84 has no effect on the performance of the printer. In the preferred embodiment of the present invention, the image surface 99 is a plane.

As stated above, each of the fiber optic multiplexers 40 produces a beam waist of different size in each of the three colors at the output end of the fiber 40*d.* Because the f-θ lens 70 is designed to work with the composite beams 42 after they have passed through a common apochromatic focusing lens and a common apochromatic beam shaping optics 52, the sizes of the red, green and blue spots at the image surface 99 will be different for the three wavelengths. The spots at the image surface 99 will maintain the same relative sizes as the red, green and blue waists located at the output end of each of the beam combining fibers 40*d*.

This variation in spot size between wavelengths does not significantly impact the perceived image quality.

In the actual embodiment, the radii of the laser spots produced by the printer 10 at the image surface 99 at the exp(−2) power level are: 0.035 mm at λ=532 nm, 0.032 mm at λ=457.9 nm, and 0.044 mm at λ=685 nm. As stated above, the image surface 99 of the f-θ lens 70 coincides with the location of the photosensitive medium 100. In this embodiment the photosensitive medium 100 is a conventional photographic paper. The paper rests on a support 100' which moves the paper in a predetermined direction. Writing with spots of this size onto photosensitive medium 100 over a scan line 12 inches long will produce sufficient resolution when the resulting prints are examined at a normal viewing distance. These spots (red, blue, green) refer to the images produced by the composite beams on an instantaneous basis. These spots are produced in a series and their location changes with the rotation of the polygon. Each pixel on the page receives up to three spots, one for each color.

Beam Shaping

Figure 10:
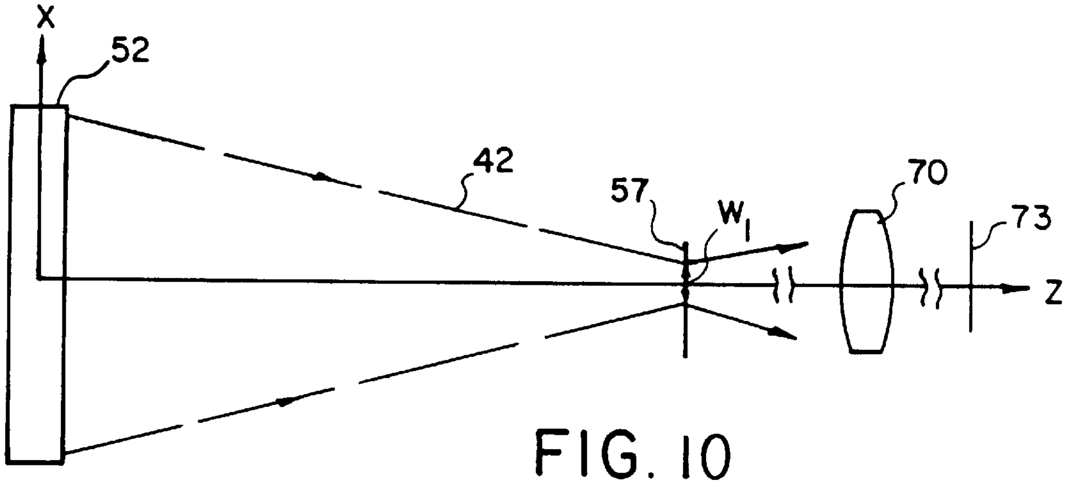
FIGS. 10 and 11 are schematic views showing a laser beam with one set of waists, $W_1$, located in one plane and another set of waists, $W_2$, located in another plane.
Figure 11:
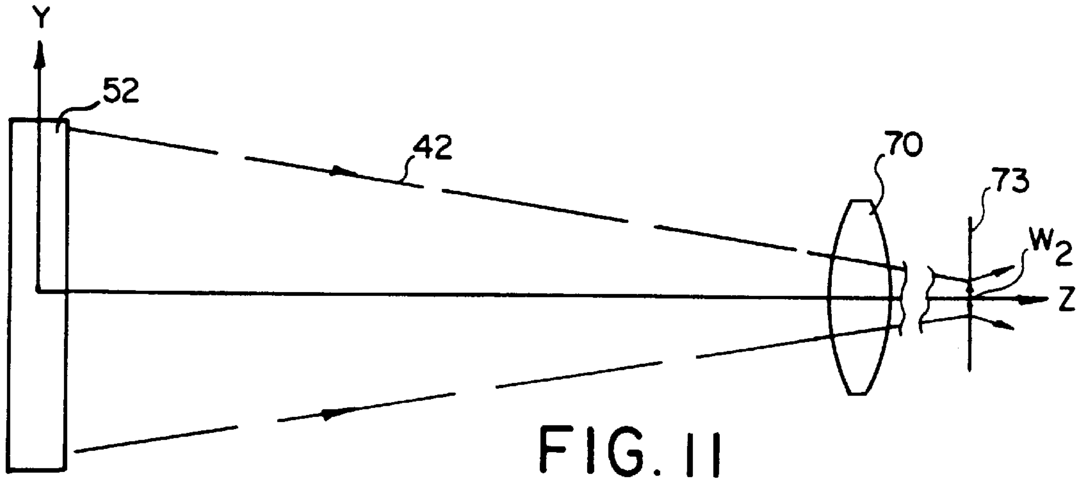

As discussed in the previous section, the cylindrical mirrors 54 and 56 of the beam shaping optics 52 direct the composite beams 42 containing all three colors toward the polygon facet 61 and cause the composite beams 42 to converge in both the line and page direction (as shown in FIGS. 10 and 11). By "beam shaping optics" we mean beam shaping optics that shape a light beam differentially in the line direction and in the page direction. In this embodiment of the printer 10, each of the composite beams 42 converges to a spot near the facet 61 in the X-Z or page direction (see FIG. 10), and toward a spot approximately one meter behind the front-most vertex $V_1$ of the f-θ lens 70 in the Y-Z or line direction (see FIG. 11). Thus, the beam shaping optics 52 adjusts the spot sizes and converges the composite beams 42 by different amounts in the page and line direction. The beam convergence is much faster in the page direction (see FIG. 11) than the line direction (see FIG. 12).

More specifically, in one embodiment the focusing lens 50 and the beam shaping optics 52 produce shaped composite beams which converge in such a manner as to produce 1.) green, page direction waists $W_1$ at a plane located 22.904 mm in front of the first vertex $V_1$ of the f-θ lens 70 (i.e., these beam waists are located between the polygon facet 61 and the f-θ lens) and 2.) green, line direction waists $W_2$ 995.7 mm behind the first vertex $V_1$ of the f-θ lens 70 (the line direction beam waists are located between the f-θ lens 70 and the image surface 99). The size of the waists may be adjusted by the beam shaping optics depending on the spot size desired at the image surface. For example, the exp(−2) power radius of the green waists in the line direction may be 0.114 mm and the exp(−2) power radius of the green waists in the page direction may be 0.0396 mm.

Similarly, the focusing lens 50 and the beam shaping optics 52 produce shaped composite beams 42 which converge in such a manner as to produce 1.) blue, page direction waists $W_1$ at a plane located 22.893 mm in front of the first vertex $V_1$ of the f-θ lens 70 and 2.) blue, line direction waists $W_2$ at a plane located 995.8 mm behind the first vertex of the f-θ lens. For example, the exp(−2)power radius of the blue waists in the line direction may be 0.104 mm and the exp(−2)power radius of the blue waists in the page direction may be 0.030 mm.

Similarly, the focusing lens 50 and the beam shaping optics 52 produce shaped composite beams which converge in such a manner as to produce 1.) red, page direction waists $W_1$ at a plane located 22.790 mm in front of the first vertex $V_1$ of the f-θ lens 70 and 2.) red, line direction waists $W_2$ at a plane located 995.9 mm behind the first vertex of the f-θ lens. For example, the exp(−2)power radius of the red waists in the line direction may be 0.144 mm and the exp(−2) power radius of the red waists in the page direction may be 0.0495 mm.

Polygon

The f-θ lens 70 of the preferred embodiment is designed to work with a variety of rotating polygons. It is particularly suitable for use with 10 facet polygons having an inscribed radius between 32.85 mm and 40.709 mm. These polygons are rotated by ±13.5 degrees to produce a scan line 12 inches long at the image surface 99.

The f-θ lens 70 also works well with 24 facet polygons having an inscribed radius between 38.66 mm and 44 mm. These polygons are rotated by ±5.625 degrees to produce scan lines 5 inches long at the image surface 99.

F-θ Lens

The lens 70 is arranged in the optical path of the printer 10 as shown in FIGS. 14*a*–14*d*.

Figure 12:
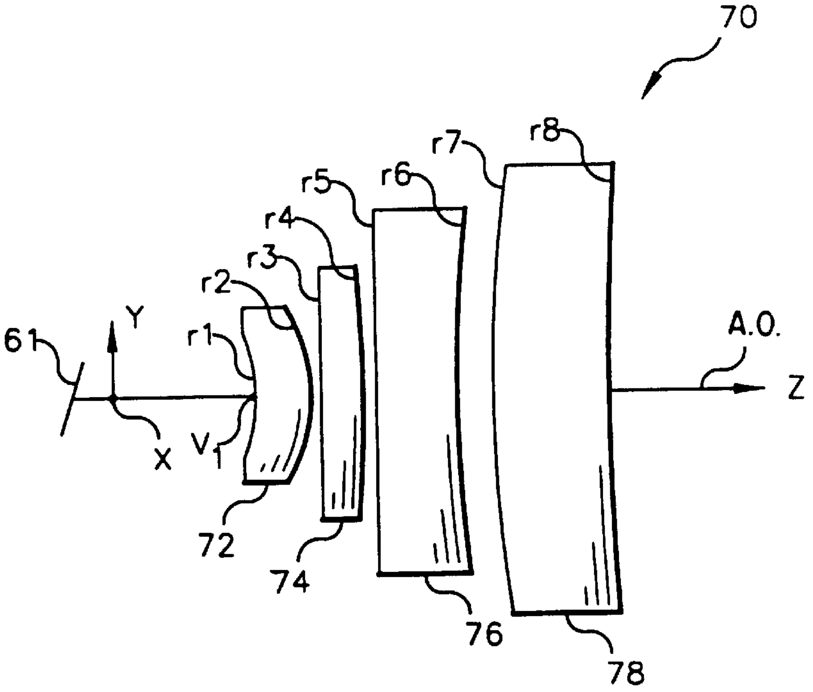
FIG. 12 is a top plan view showing the lens element arrangement in the f-θ lens shown in FIG. 1*b*.
Figure 13:
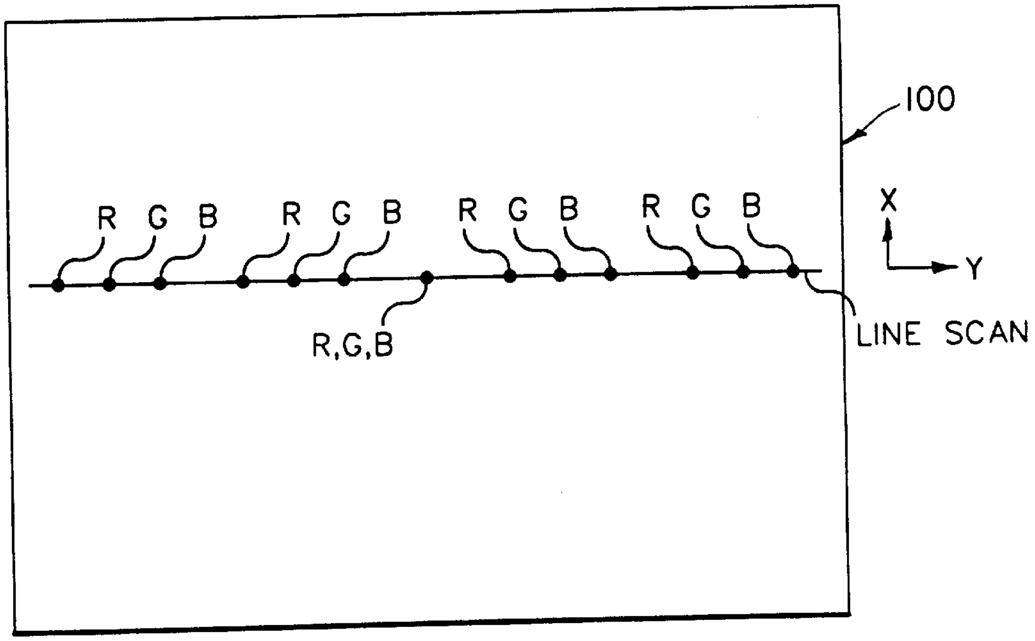
FIG. 13 illustrates schematically the color separation along a scan line on the surface of a photosensitive medium.

As shown in FIG. 12, the optical axis O. A. of the f-θ lens 70 extends in a direction referred to herein as the Z direction. When the polygon rotates (for line scanning) each of the composite beams 42 are scanned in the Y-direction. (See FIGS. 15*a*–15*c*). The cross scan (also referred to as the page direction) is in the X-direction. The performance of the f-θ lens 70 is shown in FIG. 16.

The f-θ lens 70, described herein, is particularly suitable for use in the laser printer 10. Due to the lateral color present in the f-θ lens 70, the printer 10 simultaneously produces three spatially separated scanning spots at the image surface 99. Each of the three spots contains energy in one of the three laser wavelengths. This separation is compensated for in a manner described in the "Lateral Color Correction" section of this specification. To summarize, the spots are properly superimposed on a photosensitive medium when the data rates at which the different color laser beams are modulated are linearly adjusted to compensate for the lateral color of the f-θ lens 70.

Ideally, the lateral color should be completely corrected with no residual errors by using three different data rates to move data between the digital image store and the laser modulator control circuitry. The spots should ideally travel in a straight line, at uniform velocities (as the polygon is rotated with uniform angular velocity), and should not significantly change their size and shape as they travel down the line. If necessary, the variation in the spot velocities can be compensated for by adjusting the data rate as the spots move across the scan line. The spots should have approximately circular shapes, with energy distributions which are approximately gaussian. The spot diameter at the exp (−2) level should be about 60–105 μm (in green light) in order to achieve sufficient resolution at the photosensitive medium, the smaller size being necessary to achieve overprinting of fine text on a picture. It is preferred that this spot diameter be 64–88 μm.

A further requirement of an f-θ scan lens 70 of the preferred embodiment is that it be readily manufacturable at a reasonable cost. This requires that the lens have spherical surfaces on relatively low cost glass.

The f-θ lens 70 satisfies all of the above requirements. In FIGS. 12 and 14*a* there is shown the f-θ lens 70 which is constructed in accordance with the present invention. In the present embodiment of the present invention, the f-θ lens includes four lens components arranged along an optical axis. They are: a first lens component 72 of negative optical power, a second lens component 74 of positive optical power, a third lens component 76 of negative optical power, and a fourth lens component 78 of positive optical power.

The lens components satisfy the following relationships:

$$-1.6<f_1/f<-0.9;$$

$$0.38<f_2/f<0.5;$$

$$-0.65<f_3/f<-0.50;$$

$$0.73<f_4/f<0.9,$$

where $f_1$ is the focal length of the first lens component, $f_2$ is the focal length of the second lens component, $f_3$ is the focal length of the third lens component, $f_4$ is the focal length of the fourth lens component, and f is the focal length of the f-θ lens 70. The lens component 72 is a meniscus negative element, concave toward the polygon side. Lens component 74 is a meniscus positive lens element, also concave toward the polygon. Lens component 76 is a meniscus negative lens element, concave toward the image surface 99. Lens component 78 is a meniscus positive lens element, also concave toward the image surface 99. In the exemplary f-θ lens 70, the lens elements are formed of Schott glass with the lens element 72 being an PK-51A type, the lens element 74 being LAK-21 glass, the lens element 76 being an SFL-56 glass, and the lens element 78 being an F-2 type glass. The f-θ lens 70 is apochromatic, that is, it is corrected for both the primary and the secondary axial color at a wavelength of 458 nm, 532 nm and 685 nm.

In this embodiment, the first lens component 72 is a single lens element satisfying the following equations:

$$Vd_1>65;$$

and $$P_{g,F;1}>0.53,$$

where $Vd_1$ is the V-number of the first lens component material and $P_{g,F;1}$ is its relative partial dispersion.

The details of the elements in lens 70 are shown in TABLE 1A. In this table, the radii of curvature (r1–r8) and thicknesses of the lens elements are in millimeters.

TABLE 1A

| SURF | RADIUS | THICKNESS | INDEX | V NUMBER |
|---|---|---|---|---|
| Entrance Pupil | | 24.00 | Polygon facet | |
| 1 | −33.0678 | 10.634 | 1.529 | 77.0 |
| 2 | −44.642 | 0.925 | AIR | |
| 3 | −341.050 | 7.654 | 1.641 | 60.1 |
| 4 | −85.6131 | 0.836 | AIR | |
| 5 | 423.736 | 12.550 | 1.785 | 26.1 |
| 6 | 129.480 | 6.034 | AIR | |
| 7 | 139.081 | 19.689 | 1.620 | 36.4 |
| 8 | 403.727 | | | |

The following tables 1B–1D show the f-θ compliance and the relative spot velocity achieved in the green, red and blue light for the f-θ lens when it is used with a 10 facet polygon having an inscribed radius of 32.85 mm.

TABLE 1B

F-Theta compliance and instantaneous spot velocity data:
λ = 532

| CFG NBR | ROT ANGLE | IDEAL RAYHT | ACTUAL RAYHT | DELTA RAYHT | PERCENT ERROR | REL VEL | −LOG10 REL VEL |
|---|---|---|---|---|---|---|---|
| 1 | 0.000 | 0.000 | 0.000 | 0.000 | 0.000 | 1.0000 | 0.0000 |
| 2 | 4.500 | −51.265 | −50.089 | 1.175 | −2.293 | 1.0104 | −0.0045 |
| 3 | 9.000 | −102.530 | −101.282 | 1.248 | −1.217 | 1.0440 | −0.0187 |
| 4 | 13.500 | −153.794 | −154.644 | −0.850 | 0.553 | 1.0948 | −0.0393 |
| 5 | −4.500 | 51.265 | 50.149 | −1.116 | −2.176 | 1.0129 | −0.0056 |
| 6 | −9.000 | 102.530 | 101.526 | −1.004 | −0.979 | 1.0492 | −0.0208 |
| 7 | −13.500 | 153.794 | 155.209 | 1.415 | 0.920 | 1.1023 | −0.0423 |

TABLE 1C

λ = 457.9

| CFG NBR | ROT ANGLE | IDEAL RAYHT | ACTUAL RAYHT | DELTA RAYHT | PERCENT ERROR | REL VEL | −LOG10 REL VEL |
|---|---|---|---|---|---|---|---|
| 1 | 0.000 | 0.000 | 0.000 | 0.000 | 0.000 | 1.0000 | 0.0000 |
| 2 | 4.500 | −51.237 | −50.059 | 1.179 | −2.300 | 1.0105 | −0.0045 |
| 3 | 9.000 | −102.474 | −101.224 | 1.251 | −1.221 | 1.0441 | −0.0188 |
| 4 | 13.500 | −153.712 | −154.561 | −0.849 | 0.552 | 1.0949 | −0.0394 |
| 5 | −4.500 | 51.237 | 50.119 | −1.118 | −2.183 | 1.0130 | −0.0056 |
| 6 | −9.000 | 102.474 | 101.470 | −1.005 | −0.981 | 1.0494 | −0.0209 |
| 7 | −13.500 | 153.712 | 155.132 | 1.420 | 0.924 | 1.1025 | −0.0424 |

TABLE 1D

λ = 685

| CFG NBR | ROT ANGLE | IDEAL RAYHT | ACTUAL RAYHT | DELTA RAYHT | PERCENT ERROR | VEL | −LOG10 REL VEL |
|---|---|---|---|---|---|---|---|
| 1 | 0.000 | 0.000 | 0.000 | 0.000 | 0.000 | 1.0000 | 0.0000 |
| 2 | 4.500 | −51.321 | −50.145 | 1.177 | −2.293 | 1.0104 | −0.0394 |
| 3 | 9.000 | −102.643 | −101.393 | 1.250 | −1.218 | 1.0440 | −0.0187 |
| 4 | 13.500 | −153.964 | −154.816 | −0.851 | 0.553 | 1.0950 | −0.0045 |
| 5 | −4.500 | 51.321 | 50.205 | −1.117 | −2.176 | 1.0129 | −0.0056 |
| 6 | −9.000 | 102.643 | 101.637 | −1.005 | −0.980 | 1.0491 | −0.0208 |
| 7 | −13.500 | 153.964 | 155.381 | 1.417 | 0.920 | 1.1025 | −0.0424 |

If necessary, the variation in the spot velocities can be compensated for by adjusting the rate at which data in the digital image store (described in the "Lateral Color Correction" section) is moved to the circuitry controlling the laser modulators. The adjustment amount is the same for each of the modulators.

The following Table 2 shows how the spots grow as the polygon is rotated and the spot moves across the scan line. This data is for a 10 facet polygon having an inscribed radius of 32.85 mm. A polygon rotation of ±13.5 degrees corresponds to a scan position of approximately ±6 inches at the image surface 99.

TABLE 2

$\frac{1}{e^2}$ spot sizes (mm) at image surface computed from astigmatic Gaussian beam trace using the following $\frac{1}{e^2}$ waist radii at an object plane:

λ = 532, ω = .00189; λ = 457.9, ω = .00172; λ = 685, ω = .00237.
Effects of beam truncation are not included in this computation.

| POLYGON ROTATION | 13.500° | 9.000° | 4.500° | 0.000° | −4.500° | −9.000° | −13.500° |
|---|---|---|---|---|---|---|---|
| λ = 532 ωy | 0.0390 | 0.0371 | 0.0359 | 0.0355 | 0.0359 | 0.0371 | 0.0390 |
| ωx | 0.0359 | 0.0355 | 0.0353 | 0.0352 | 0.0353 | 0.0356 | 0.0358 |
| λ = 457 ωy | 0.0360 | 0.0340 | 0.0328 | 0.0325 | 0.0328 | 0.0340 | 0.0357 |
| ωx | 0.0329 | 0.0324 | 0.0322 | 0.0322 | 0.0323 | 0.0325 | 0.0328 |
| λ = 685 ωy | 0.0490 | 0.0467 | 0.0452 | 0.0450 | 0.0452 | 0.0467 | 0.0489 |
| ωx | 0.0477 | 0.0443 | 0.0441 | 0.0441 | 0.0442 | 0.0444 | 0.0446 |

where $\omega y$ = line direction $\frac{1}{e^2}$ spot radius and $\omega x$ = page direction $\frac{1}{e^2}$ spot radius Pyramid Error Correction Printers utilizing rotating polygon deflectors are subject to an image defect known as banding, which is most easily seen in areas of the image where it is free of subject detail, i.e., a blank wall or a cloud free sky scene. Light and dark bands, which are not part of the desired image, will appear in these areas. These bands are caused by repetitive non uniform spacing of the scan lines. The banding is caused by a facet, or facets on the polygon which are tilted slightly out of position. Thus, every time the facet which is out of position comes around, it will cause a laser beam to move ever so slightly out of the nominal laser beam plane, i.e., the plane formed by a rotating laser beam in the absence of any pyramid error. After going through an f-θ lens, this misplaced laser beam will land in a slightly different position on the image surface, generating what is known as a "cross scan" error, since the position error is in a direction which is perpendicular to the scan line. An f-θ lens must function with the other optical elements in the printer to produce an image which is free from banding when a "good" polygon is used, that is, a polygon in which pyramidal angle errors on the polygon facets do not exceed ±10 arc seconds, as measured with respect to the axis of rotation of the polygon.

In an embodiment of the present invention, the pyramid error is corrected by keeping the polygon facet 61 conjugate with the image surface 99 in the page meridional (X-Z plane). (Conjugate points are defined herein as any pair of points such that all rays from one are imaged on the other within the limits of validity of gaussian optics). This conjugation is achieved by the conjugating cylindrical mirror 80 working in conjunction with f-θ lens 70. Thus, there is a focal point (beam waist) at both the polygon facet 61 and at the photosensitive medium 100, and the polygon facet is thereby conjugated to the photosensitive medium 100. As a result, if the polygon facet 61 is tilted slightly in the X-Z plane, that is, around the "object" point, the path of the rays through the printer 10 is slightly different from that shown in the figure, but the rays all go to the same "image" point, and the cross scan error is zero.

The conjugation condition described above imposes requirements on the beam shaping optics. Conjugation of the polygon facet 61 and the image surface 99 in the page direction implies that in the page direction, a beam waist (for each wavelength) is located at (or adjacent to) both locations (i.e., at or near the polygon facet 61, and at or near the image surface 99). Hence, for each of the composite beams the beam shaping optics 52 must produce a beam waist $W_1$ in the page direction at the plane 57 located at or near the polygon facet 61. This is achieved in the current design as is discussed in the "Beam Shaping" section and is shown in FIG. 10. It is preferred that the beam waist in the page direction be located less than $$\frac{1f}{100}$$

from the polygon facet 61 (where f is the focal length of the f-θ lens).

The degree of convergence (of the composite beams 42) in the line direction is not similarly constrained. In the present embodiment, the beam shaping optics 52 converges the composite beams 42 in the line direction to form a plurality of beam waists behind the rear focal point of the f-θ lens 70. It is preferred that the beam waists $W_2$ in the line direction at a distance be at least ⅓ behind the first vertex $V_1$ of the f-θ lens 70 (see FIG. 11). In the printer 10 the distance between the rear focal point of the f-θ lens and the waist location is approximately equal to the focal length of the f-θ lens 70. More specifically, the f-θ lens 70 has a focal length of 426.4 mm and the line direction waists formed by the beam shaping optics 52 are located 488.9 mm behind the rear focal point. This arrangement has been found to allow superior correction of the f-θ lens and other post-polygon optics, as well as providing a compact system.

The conjugating cylindrical mirror 80 (see FIG. 14*e*) is located between the f-θ lens 70 and the photosensitive medium 100. As stated above, it corrects for the pyramid error of the polygon facets by conjugating, in the X-Z plane, the polygon facet 61 with the image surface 99. This cylindrical mirror 80 has a concave radius (in the page direction) of 190.500 mm and is located 153.053 mm behind the last vertex of the f-θ lens. The cylindrical mirror 80 is tilted by 7 degrees and deviates the composite beams 42 by 14 degrees. The image surface 99 is located 162.96 mm behind the cylindrical mirror 80, the distance being measured along the deviated beam. As mentioned above, various plano fold mirrors 84 may be placed behind the polygon and the f-θ lens without affecting performance.

Figure 15A:
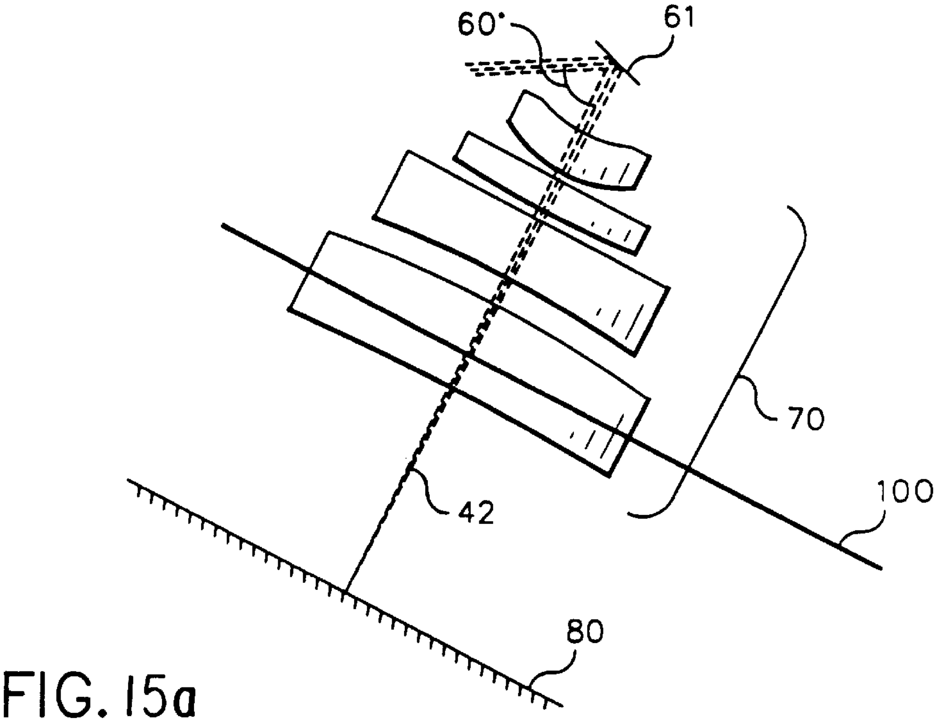
FIGS. 15*a*–15*c* are plan views of the f-θ lens, the plano mirror and the cylindrical mirror illustrated in FIG. 14*a*. More specifically.
Figure 15B:
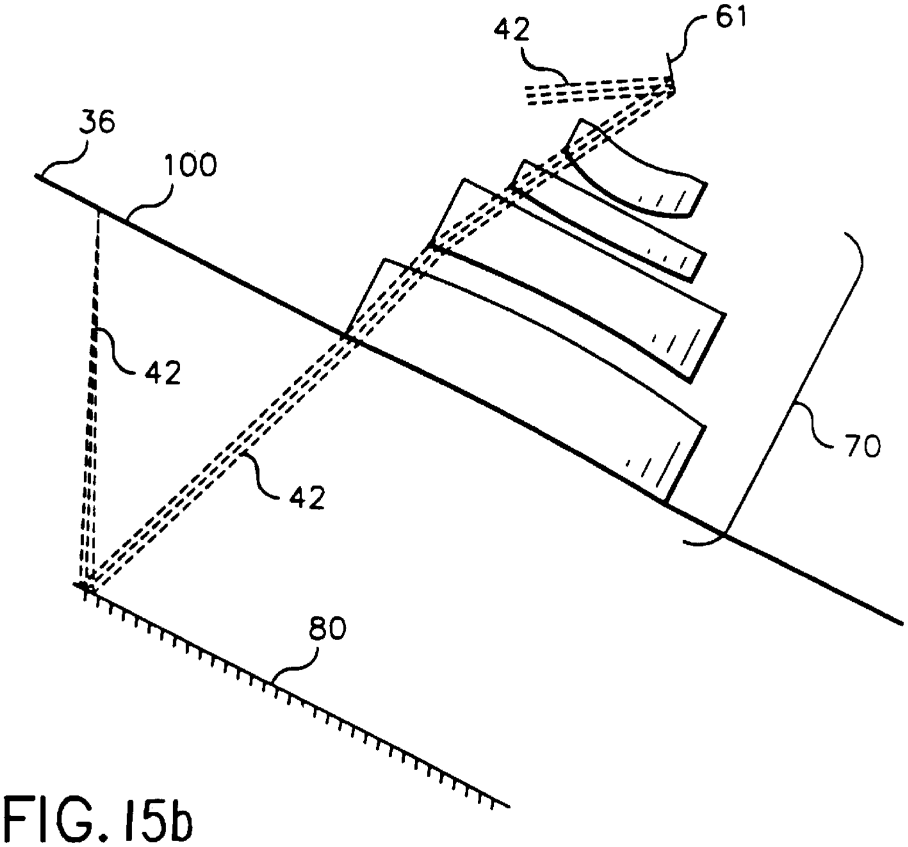
Figure 15C:
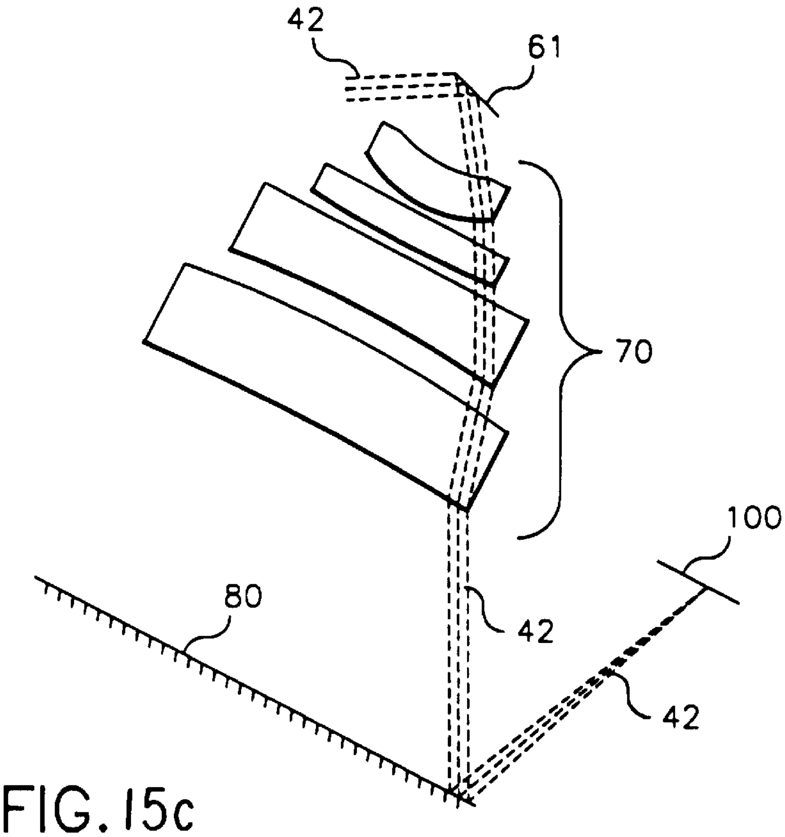
Figure 16:
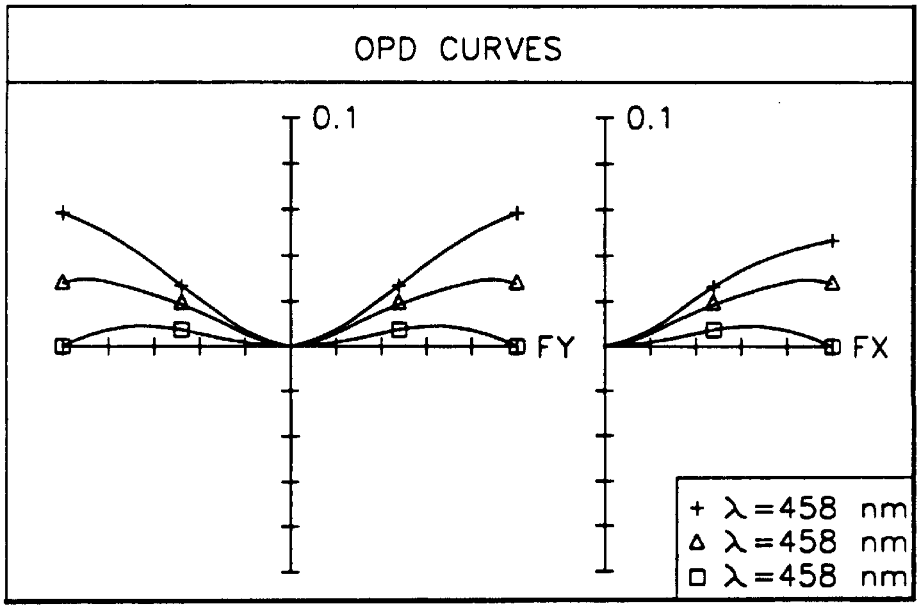
FIG. 16 is a an aberration plot showing the optical path differences at the center of a scan line in all three wavelengths.

FIGS. 15*a*, 15*b*, 15*c* show the position of the composite beams 42 on the photosensitive medium 100 (located at the image surface 99) for polygon rotations of +13.5, 0, and −13.5 degrees respectively. This represents scan angles of +27, 0, and −27 degrees, respectively.

More specifically, in Table 3, the computed cross scan image displacements for the chief (central) rays of the light beam (at wavelengths of 532 nm, 457 nm and 685 nm) are tabulated. It will be seen that the cross scan displacements are certainly well within acceptable limits.

Table 3 shows the cross scan displacement due to 10 arc seconds of pyramid error on polygon facet. The displacement units are micrometers.

TABLE 3

| POLYGON ROTATION | FIELD ANGLE | λ = 532 nm | λ = 457 nm | λ = 685 nm |
|---|---|---|---|---|
| CROSS SCAN DISPLACEMENT | | | | |
| 4.5° | 9.0° | −0.0204568 | −0.0103607 | −0.0299763 |
| 9.0° | 18.0° | −0.0210595 | −0.0113009 | −0.0301466 |
| 13.5° | 27.0° | −0.0327880 | −0.0235740 | −0.0411589 |
| −4.5° | −9.0° | −0.0189723 | −0.0079102 | −0.0294039 |
| −9.0° | −18.0° | −0.0209200 | −0.0091726 | −0.0318579 |
| −13.5° | −27.0° | −0.0465809 | −0.0344084 | −0.0576246 |
| none | 0.0° | −0.0202603 | −0.0097542 | −0.0302057 |

Axial Color Aberration

There are two kinds of color aberrations in any lens system: axial color and lateral color. Axial color causes light of different wavelengths to come to a focus at different distances from the rear surface of the lens system. Since axial color is a focus-related phenomenon, it is caused not only by aberrations in a lens system itself but also by the vergence of the input light beam to the lens system.

In the printer 10, the line direction vergence of the green, blue, and red laser beams cannot be adjusted independently because the beam shaping optics 52 is common to the three (combined) laser beams. This makes the correction of the axial color more difficult. For the printer 10, the axial color must be corrected when the three laser beams have essentially the same vergence. This is what has been done in the f-θ lens 70, as is shown in the OPD plots in FIG. 16, which correspond to f-θ lens performance at the center of the line scan. The construction of the f-θ lens 70 is disclosed in the "F-θ Lens" section of the application.

The axial color in the page direction must be corrected in order to prevent color banding due to pyramid errors. Otherwise, the pyramid error will only be corrected in a single color. In the printer 10 the axial color is corrected in both meridians, all the elements are spherical, a costly cemented cylindrical doublet is unnecessary, and the pyramid error is corrected with the conjugating cylindrical mirror 80.

Lateral Color Correction

As stated previously, the lateral color aberration of the f-θ lens 70 is uncorrected. Lateral color is the variation in image height of focused spots having different wavelengths, or colors, taken in a specified image surface (see FIG. 12*b*).

For example, in normal photographic objectives for use in color photography, lateral color is typically measured by $$Y'(\text{at } \lambda_1{=}486.1\text{ nm}) - Y'(\text{at } \lambda_2{=}656.3\text{ nm});$$

this is the difference in image height taken in the gaussian focal plane for λ=546.1 nm, between the blue point image and the red point image. Lateral color, as opposed to axial color, only occurs away from the optical axis, out in the field of the lens. Usually, the farther away from the axial image point, the greater the amount of lateral color. Thus, the largest amount of lateral color often occurs near the edge of the field of view of the lens. In the printer 10, the lateral color is exhibited as a separation of red, blue and green spots along the scan line at the photosensitive medium (FIG. 12*b*).

Figure 17:
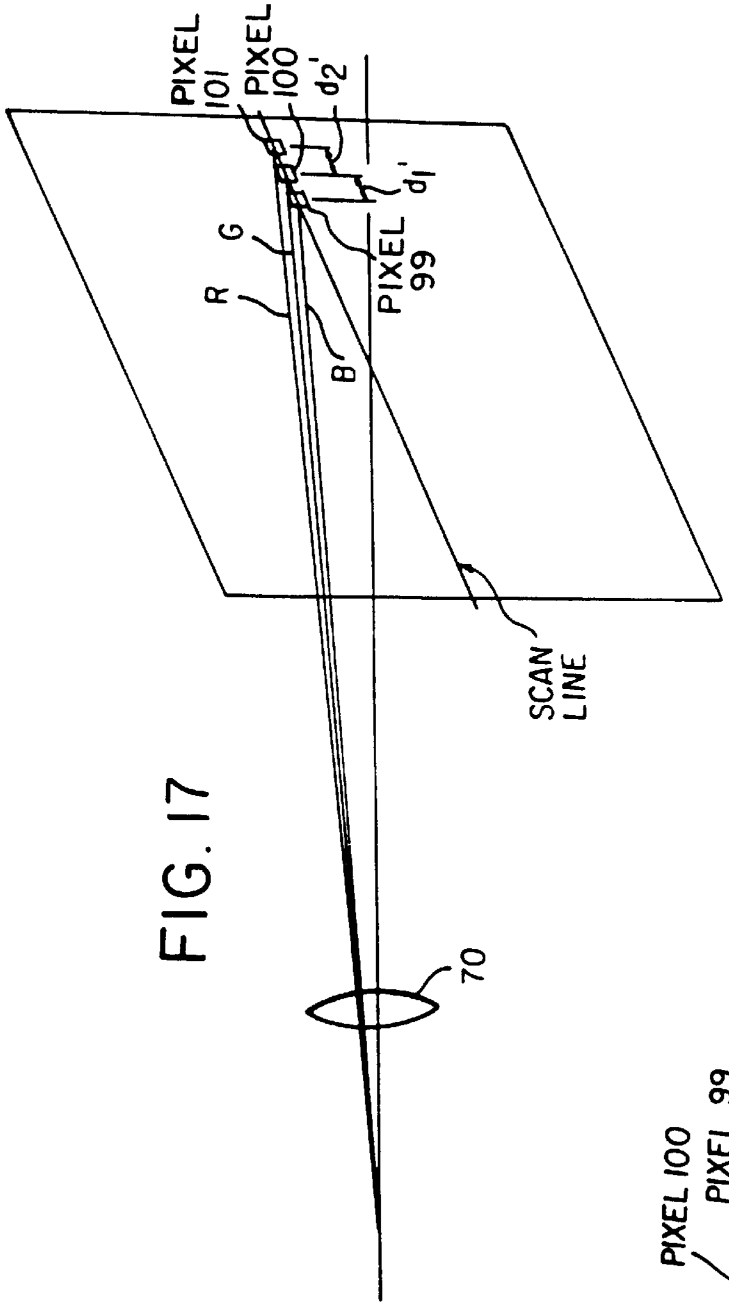
FIG. 17 illustrates schematically how different color laser beams intercept pixels at a given time $T_1$.

The lateral color in the printer 10 is corrected by modulating the three color laser beams at three different data rates. To understand this, consider the following hypothetical example. Suppose that the lateral color in an f-θ lens is such that for a given amount of polygon rotation the green laser beam intercepts the image surface at a location 100 pixels high whereas the red laser beam intercepts the image surface at a location 101 pixels high and the blue laser beam intercepts the image surface at a location 99 pixels high (see FIG. 17). For example, if the printer worked at 512 dots per inch, the blue and green spots would be separated by a distance $d_1$=1/512 inch and the red and green spots would be separated by a distance $d_2$=1/512 inch. According to one embodiment of the invention, the rate at which data is moved from a digital image store to the circuitry controlling the laser modulators is determined by three data clocks $C_1$–$C_3$ shown in FIG. 1*b*. One clock controls the data rate for the green channel, a second clock controls the data rate for the blue channel, a third clock controls the data rate for the red channel. If these three clocks are run at the same rate, then, at any instant in time, the three laser intensities correspond to the required green, blue and red intensity values for the same pixel. Due to the spot separation ($d_1'$, $d_2'$) produced at the image surface 99 by the lateral color in the f-θ lens, the image recorded on the photosensitive medium will show color fringing at an image location of 100 pixels high. More specifically, there will be color fringing of two pixels between red and blue, one pixel between green and red and one pixel between green and blue.

Figure 18:
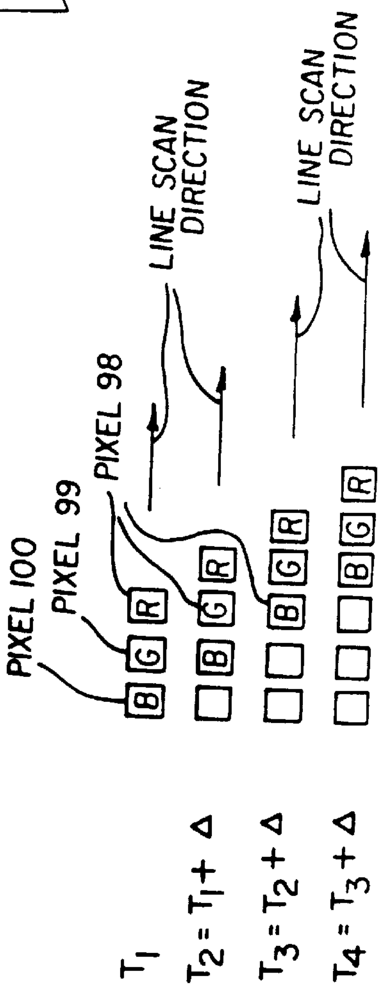
FIG. 18 is a schematic illustration showing different pixels at the photosensitive medium receiving red, green and blue laser beams at different times.

Now suppose that the blue data clock is run at a frequency (i.e., data rate) $f_B$ which is 99% of the green clock frequency $f_G$ and that the red clock is run at a frequency $f_R$ which is 101% of the green clock frequency. At the given amount of polygon rotation, the green laser beam will intercept the image surface at a location 100 pixels high and the modulation of the laser beam is appropriate to produce the exposure of the 100th pixel. Likewise, at this same polygon rotation, the red laser beam still intercepts the image surface at a location 101 pixels high. However, since the red clock is being run at 101% of the frequency of the green clock, the red laser beam is now correctly data modulated to give the proper exposure for the 101st pixel. Similarly the blue laser beam remains 99 pixels high, but the blue laser light is data modulated to give the proper exposure for the 99th pixel. That is, at any given time (or at any given polygon rotation position) the laser printer 5 may produce three color spots at each scan line, but the image information contained in each one of the three color beams is different—i.e., it corresponds to different pixels on the scan line. So at same time $T_1$, pixel 98 will receive the red beam R, at time $T_1+\Delta$ the pixel 98 will receive the green laser beam G, and in time $T_1+2\Delta$ it will receive the blue laser beam B (FIG. 18). This way, when the printer is operating in locations other than the center of the line scan, each pixel can receive red, green and blue image modulated light, albeit at a different time. Therefore, there will be no color fringing at the 100th pixel. Thus, in the printer 10, the data rates $f_B$, $f_G$ and $f_R$ are not the same. More specifically, the data rates are $f_B=k_1\times f_G$, $f_R=k_2\times f_G$, where $k_1$ and $k_2$ are constants chosen to compensate for spot separation during the line scan.

In any laser printer, there is a detection procedure to determine a specific starting location for each line on the photosensitive medium. In a printer 10, this is done by utilizing a "split" (dual) detector and the (unmodulated) red light beam to generate the initial start up pulse. More specifically, the split detector detects the presence of the laser beam and from its location (with respect to the beginning of the line), determines the time delays needed for starting of the modulation of each of the three color laser beams, so that the appropriate pixel at the beginning of the line scan is exposed with the laser beam carrying the proper data information.

A potential problem remains that the same clock rates which produced good results for an image height of 100 pixels might still produce color fringing at other image heights. However, in the printer 10, these residual lateral color errors have been corrected in the f-θ lens 70 so that the worst residual error (due to the lateral color aberration) over the entire scan line is less than 20% of the size of a green pixel. This is shown in tables 2 and 4. Table 2 shows the spot size across the scan line. Table 4 shows the residual lateral color when the laser beams are modulated at the rates shown at the bottom of the table. Both of these tables are for a 10 facet polygon with an inscribed radius of 32.85 mm. Similar results hold for the other 10 facet polygon sizes. The results for the 24 facet polygons are much better.

TABLE 4

Difference in line direction image position (in millimeters) for red, green and blue colors with red, green and blue pixel clocks in drive electronics adjusted in the ratio of 1.0011: 1.0000: 0.99946

| ROT ANGLE | (λ = 457) − (λ = 532) Residual Error (Blue-Green) | (λ = 685) − (λ = 532) Residual Error (Red-Green) |
|---|---|---|
| 4.500 | 0.003 | 0.001 |
| 9.000 | 0.003 | 0.003 |
| 13.500 | 0.001 | −0.002 |
| −4.500 | −0.003 | −0.001 |
| −9.000 | −0.001 | −0.002 |
| −13.500 | 0.006 | 0.002 |

Green λ = 532 nm; Blue λ = 457.9 nm; Red λ = 685 nm

In a laser printer of a type which can incorporate the f-θ lens of the present invention, the system parameters can be as follows:

Wavelengths: 532, 457.9, and 685 nm

Scan length: 12 inches

Polygon Duty Cycle: 0.75

Polygon inscribed radius: 32.85 through 40.709

Number of polygon facets: 10

Total Scan angle: 54 degrees. (±27 degrees with respect to the optical axis; ±13.5 degrees of polygon rotation)

Light beam input angle onto polygon facet: 60 degrees from optical axis of f-θ lens (30 degree angle of incidence on polygon facet)

Desired gaussian beam radius at the exp(−2) power point: 0.035 mm at λ=532 nm.

In a laser printer of a type which incorporates the f-θ lens 70 of the present invention, the system parameters can also be as follows:

Wavelengths: 532, 457.9, and 685 nm

Scan length: 5 inches

Polygon Duty Cycle: 0.75

Polygon inscribed radius: 38.66 through 44.00

Number of polygon facets: 24

Total Scan angle: 22.5 degrees. (±11.25 degrees with respect to the optical axis; ±5.625 degrees of polygon rotation)

Light beam input angle onto polygon facet: 60 degrees from optical axis of f-θ lens (30 degree angle of incidence on polygon facet)

Desired gaussian beam radius at the exp(−2)power point: 0.051 mm at 532 nm.

As stated above, the f-θ lens 70 itself is not corrected for lateral color. Correction of the lateral color in the scanner requires running the green, blue, and red clocks modulating the lasers in the ratio 1:000: 0.99946: 1.0011.

As disclosed in the "Axial Color Aberration" section of this specification, the f-θ scan lens 70 by itself is corrected for primary and secondary axial color. This is a requirement for this type of scanner because the beam shaping optics 52 is common to all composite beams. In the X-Z direction, the f-θ scan lens conjugates the polygon facet to the image surface (in all three wavelengths), this requires the use of an auxiliary cylindrical mirror having power in only the X-Z direction. Assuming the "object" is at the polygon facet, the axial color in the X-Z direction for the f-θ lens 70 is zero; it is also zero for the cylindrical mirror and, hence, the conjugation holds at all three wavelengths.

It is an advantage of the printer of the present invention that it enables color printing much faster than prior art color printers.

The invention has been described in detail with particular reference to the embodiment thereof, but it will be understood that variations and modifications can be effected within the spirit and scope of the invention. For example, other laser sources producing light beams in wavelengths other than 458 nm, 532 nm or 685 nm may be also utilized as long as the photosensitive medium is sensitive to these wavelengths. Thus, this invention can be used in a printer printing on a photographic paper, or on a "false sensitive paper". Printers utilizing such "false sensitive paper" are well known. Changing the wavelengths will change the ratios between the corresponding data rates.

The term printer, for purposes of this specification means any image producing apparatus. Such an apparatus may be a printer, a copier or a fax machine, for example.

PARTS LIST printer 10
light beam 12, 14, 16
3 laser sources 22, 24, 26
3 modulators 21, 34, 36
beam combiner 40
beam combining fiber **40*d***
composite light beam 42
holder 43
grooves **43*a***
waveguide channels **43*b***
channel spacing **43*c***
focusing lens 50
beam shaping optics 52
cylindrical mirrors 54, 56
1st waist plane 57
light deflector (polygon) 60
Polygon Facet 61
axis of rotation 63
f-θ lens 70
four lens components 72, 74, 76, 78
cylindrical mirror 80
flat fold mirror 84
processor unit 90
means for reading 92
means for controlling 94
image surface 99
photosensitive medium 100
support 100'

We claim:

1. A color printer for imaging on an image plane, said color printer comprising in order:

(a) a plurality of light sources, each of said light sources being adapted to provide a spatially coherent, composite beam of light including a plurality of spectral components;

(b) a single beam shaping optics processing said composite beams, said beam shaping optics having optical elements adapted to form for each of said composite beams (i) a first beam waist in a cross scan direction of said composite beam and (ii) a second beam waist in a scan section of said composite beam, said first and second beam waists being spaced from one another;

(c) a deflector adapted to move said plurality of composite beams across the image plane, said deflector being located closer to said first beam waists than to said second beam waists; and (d) scan optics located between said deflector and the image plane, said scan optics being adapted to (i) geometrically conjugate said deflector to the image plane in the cross scan direction of each composite beam for each of the spectral components, and (ii) re-image said first and second beam waists onto the image plane.

2. A color printer for imaging on a photosensitive medium, said color printer comprising in order:

(a) a plurality of light sources, each of said light sources being adapted to provide a spatially coherent, composite beam of light including a plurality of spectral components;

(b) a single beam shaping optics processing said composite beams, said beam shaping optics having optical elements adapted to form for each of said composite beams (i) a first beam waist in a cross scan direction of said composite beam and (ii) a second beam waist in a scan section of said composite beam;

(c) a deflector moving said plurality of composite beams across the photosensitive medium, said deflector being located proximately to said first beam waists; and (d) scan optics located between said deflector and the photosensitive medium, said scan optics being adapted to (i) geometrically conjugate said deflector to the photosensitive medium in the cross scan direction of each composite beam for each of the spectral components, and (ii) re-image said first and second waists onto the photosensitive medium.

3. A color printer of claim 2 further including a plurality of modulators adapted to individually modulate intensity of each spectral component of each of said composite beams.

4. A color printer of claim 2, wherein said modulators are acousto-optical modulators.

5. A color printer of claim 2 further including a plurality of lasers producing red, green, and blue color laser beams;

a plurality of fiber optic multiplexers, each having at least one beam combining fiber, said multiplexers combining said red, green, and blue color laser beams into said composite beams, whereby said composite beams exit said beam combining fibers; and a waveguide having a plurality of input ports defining an input end of said waveguide and a plurality of exit ports defining an exit port end of said waveguide, said input ports being connected to said exit ports by a plurality of channels separated by a first set of distances at said input port end and by another set of distances at said exit port end, so that said distances at said input port end are larger than said distances at said exit port end; each of said beam combining fibers is being coupled to a respective one of said channels at said input port end so that said composite beams propagate through said channels toward said exit port end and move closer to one another while they so propagate.

6. A color printer of claim 5, wherein said channels of said waveguide are adapted to accept said beam combining fibers with their cladding intact.

7. A color printer of claim 5, wherein each of said waveguide channels and each of said beam combining fibers of said multiplexers are characterized by a fundamental mode, and the fundamental mode of each of said waveguide channels closely matches the fundamental mode of a respective one of said beam combining fibers.

8. A color printer of claim 5, wherein the waveguide channel spacing is reduced as the beams propagate a long their length, said reduction resulting in channels being as close as possible to one another without causing cross talk between the beams of adjacent channels.

9. A color printer of claim 5, wherein said deflector is a rotating polygon with a plurality of reflective facets, and said respective one of said polygon facets is imaged onto the photosensitive medium in the cross scan section to correct (i) pyramid error of the polygon and (i) scan line bow of off-axis beams.

10. A color printer according to claim 5, wherein said waveguide has a tilted surface at said exit port end, said surface being tilted in a page scan direction such that exposed scan lines overlap at the 50% intensity levels in the cross scan direction.

11. A color printer according to claim 5, wherein said deflector is a rotating polygon, and said scan optics produces a linear scan height versus polygon rotation angle, a rate of change in said scan height versus said rotation angle being different for each spectral component; and each pixel is exposed by an appropriate one of said spectral component of said composite beam, said spectral component being modulated by a data rate that differs from data rates of other spectral components.

12. A color printer as in claim 5 further having a predetermined cross scan direction pitch, and wherein said composite beams are separated in the cross scan direction by a multiple of two to four times the desired cross scan pitch, and an in between scan line is being exposed by interleave printing in later scans.

13. A color printer as in claim 5 further having a predetermined cross scan direction pitch, wherein the composite beams are separated by an arbitrary factor of said cross scan direction pitch, said waveguide being tilted to adjust the cross scan pitch of said composite beams to an integer multiple of said cross scan pitch by tilting said waveguide, and any in between scan lines are being exposed by interleave printing in later scans.

14. A color printer of claim 5 further including:

each beam combining fiber of the multiplexers has its cladding reduced such that it becomes tapered to a diameter not exceeding four times the fiber core diameter, said beam combining fibers being held in a fixed relationship with respect to each other in a V-block;

a scan optics located between the deflector and the photosensitive medium, said scan optics having a structure to (I) image a deflecting surface of said deflector onto the photosensitive medium in the cross scan section such as to correct for pyramid error and scan line bow associated with off-axis beams, (ii) form a plurality of waists of each wavelength in both the scan and cross scan directions very close to the photosensitive medium.

15. A color printer as in claim 14, wherein said V-block is tilted to provide exposed scan lines with sufficient overlap in the cross scan section on the photosensitive medium.

16. A color printer as in claim 14, wherein said deflector is a rotating polygon, and said scan optics produces a linear scan height versus polygon rotation angle, a rate of change in said scan height versus said rotation angle being different for each spectral component; and each pixel is exposed by an appropriate one of said spectral component of said composite beam, said spectral component being modulated by a data rate that differs from data rates of other spectral components.

17. A color printer as in claim 14 further having a predetermined cross scan direction pitch and wherein the composite beams are separated in the cross scan direction by a multiple of two to four times the cross scan pitch, and in between scan lines are being exposed in later scans.

18. A color printer as in claim 14 further having a predetermined cross scan direction pitch, wherein the composite beams are separated by an arbitrary factor of said cross scan pitch, the composite beams cross scan pitch is being adjusted to be an integer multiple of the cross scan pitch by tilting the V-block, and wherein any in between scan lines are being exposed in later scans.

* * * * *